United States Patent
Sato et al.

(10) Patent No.: US 6,879,726 B2
(45) Date of Patent: Apr. 12, 2005

(54) IMAGE PROCESSING METHOD, APPARATUS AND STORAGE MEDIUM

(75) Inventors: Makoto Sato, Tokyo (JP); Hiroshi Kajiwara, Tokyo (JP); Hiroki Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 811 days.

(21) Appl. No.: 09/793,538

(22) Filed: Feb. 27, 2001

(65) Prior Publication Data

US 2001/0028747 A1 Oct. 11, 2001

(30) Foreign Application Priority Data

| Mar. 3, 2000 | (JP) | 2000-059329 |
| Jan. 12, 2001 | (JP) | 2001-005524 |
| Feb. 23, 2001 | (JP) | 2001-048390 |

(51) Int. Cl.[7] .................................................. G06K 9/46
(52) U.S. Cl. ......................................... 382/239; 382/240
(58) Field of Search .............................. 382/232, 239, 382/240, 248; 375/240.19

(56) References Cited

U.S. PATENT DOCUMENTS

| 6,101,282 A | 8/2000 | Hirabayashi et al. ....... 382/246 |
| 6,229,926 B1 * | 5/2001 | Chui et al. .................. 382/240 |
| 6,233,355 B1 | 5/2001 | Kajiwara .................... 382/238 |

* cited by examiner

*Primary Examiner*—Leo Boudreau
*Assistant Examiner*—Duy M. Dang
(74) *Attorney, Agent, or Firm*—Fitzpatrick, Cella, Harper & Scinto

(57) ABSTRACT

An image processing apparatus includes a wavelet transformation unit for wavelet-transforming input image data on a per-image basis, and an encoder for changing transformation coefficients, which have been obtained by the transformation, to bit planes from higher- to lower-order bits, and encoding the bit planes one bit plane at a time. A code-quantity prediction unit determines whether all encoded data of each of the image data that have been encoded can be stored in the memory when the encoded data obtained by the encoder is stored in the memory image by image. If all of the encoded data cannot be stored, the encoded data that overflows the memory is divided and the divided encoded data is stored in the memory by writing the divided encoded data equally over storage areas of the lower-order bit planes of each of the image.

29 Claims, 19 Drawing Sheets

FIG. 7A

| MH | TH0 | BS0 | TH1 | BS1 | ... | THn-1 | BSn-1 |

FIG. 7B

| IMAGE SIZE | TILE SIZE | NUMBER OF COMPONENTS | COMPONENT INFORMATION |

FIG. 7C

| TILE LENGTH | ENCODED PARAMETERS |

FIG. 7D

| LL | HL2 | LH2 | ... | LL | LL | HL2 | LH2 | HH2 | LH2 | HL1 | LH1 | HH1 |

Bit Plane S-1 | Bit Plane S-2 | Bit Plane 0

| TILE | CODE LENGTH | TERMINUS ADDRESS | NUMBER OF FRAGMENTS | AMOUNT OF OVERWRITE | ENTRY |
|---|---|---|---|---|---|
| T0 | L0 | TA0 | 0 | 0 | — |
| T1 | L1 | TA1 | 0 | 0 | — |
| ⋮ | ⋮ | ⋮ | ⋮ | ⋮ | ⋮ |
| T14 | L14 | TA14 | 0 | 0 | — |
| T15 | L15 | TA15 | 0 | 0 | — |

| TILE | CODE LENGTH | TERMINUS ADDRESS | WRITE-ENABLE FLAG | NUMBER OF FRAGMENTS | AMOUNT OF OVERWRITE | ENTRY |
|------|-------------|------------------|-------------------|---------------------|---------------------|-------|
| T0   | L0          | TA0              | 1                 | 0                   | 0                   | —     |
| T1   | L1          | TA1              | 0                 | 0                   | 0                   | —     |
| T2   | L2          | TA2              | 1                 | 0                   | 0                   | —     |
| T3   | L3          | TA3              | 1                 | 0                   | 0                   | —     |
| ⋮    | ⋮           | ⋮                |                   | ⋮                   | ⋮                   | ⋮     |
| T14  | L14         | TA14             | 1                 | 0                   | 0                   | —     |
| T15  | L15         | TA15             | —                 | 10                  | FL15                | SOF15 |

IMAGE PROCESSING METHOD, APPARATUS AND STORAGE MEDIUM

FIELD OF THE INVENTION

This invention relates to an image processing apparatus, method and storage medium for dividing an image into a plurality of tiles and encoding the image.

BACKGROUND OF THE INVENTION

The development of computers in recent years has been accompanied by wider use of applications in which various documents and images are processed by computer. An inexpensive, high-performance apparatus not only for industrial use but for home use as well is being sought for devices such as digital cameras and printers that serve as input/output devices for inputting/outputting image information when image information is handled by such a computer. The proliferation of so-called multimedia has led to an improvement in image definition which, in turn, has been accompanied by a great increase in the quantity of image data handled by apparatus of the kind mentioned above.

FIGS. 19A and 19B are block diagram illustrating the construction of an image processing apparatus such as a digital camera or printer. FIG. 19A shows the overall construction of the apparatus, in which image data of an image that is to be output is applied to an image input unit 1, which proceeds to output the image data in raster-scan order to an image encoder 2. The image data is compressed and encoded by the image encoder 2 to obtain a code stream that is stored temporarily in a memory 3. The code stream that has been stored in the memory 3 is output to an image decoder 4, which decodes the code to a digital image data representing the original image. The digital image data is output as an image by an image output unit 5.

The JPEG scheme has been used widely as the image encoding and decoding method in an image processing apparatus of the kind described above. FIG. 19B is a diagram showing the basic construction of the image encoder 2, which performs encoding in accordance with the JPEG standard. If the input image data is a color data, the image data is subjected to a predetermined color-space transformation and subsampling and the resulting image data is input to a discrete cosine transformation unit 201a. The latter subjects the input image data to a discrete cosine transform in units of a predetermined block size and outputs the transformation coefficients to a quantizer 202a. The latter quantizes the input transformation coefficients at a predetermined quantization step and outputs the resulting image data to an entropy encoder 203a. This encoder subjects the quantized coefficients to Huffman coding and outputs a code stream.

In accordance with the scheme described above, image data is compressed at a comparatively high compression rate and the compressed data is stored in the memory 3. The compression rate is adjusted by the quantization step of the quantizer 202a. However, since the output of the entropy encoder 203a is a variable-length code, the length of the data that has been encoded varies in dependence upon the input image data even though the quantization step is held at a constant value. In the image processing apparatus shown in FIG. 19A, therefore, a problem which arises is that the amount of memory capacity needed for memory 3 cannot be decided by processing based upon a fixed quantization step.

Accordingly, in order to arrange it so that the memory 3 can positively accommodate a code stream obtained by compressing and encoding an image, it is necessary to decide the memory capacity by anticipating the minimum compression rate assumed to be applied or to decide the memory capacity by compressing the image data while varying the quantization step, and then changing the quantization step dynamically, in conformity with the image data to be processed, in such a manner that the code stream will fit into the memory 3. With the former approach, however, the cost of the apparatus is raised by providing a large memory capacity. With the latter expedient, processing is complicated and a plurality of trial runs are necessary in order to decide upon a proper value for the quantization step. The end result is prolonged processing time.

SUMMARY OF THE INVENTION

Accordingly, an object of the present invention is to provide an image encoding method, apparatus and storage medium which, when an image that has been divided into a plurality of tiles is encoded tile by tile and stored in a memory having a predetermined capacity, or when a plurality of images are encoded separately and stored in a memory having a predetermined capacity, make it possible for code of an amount that has exceeded the memory capacity to be stored in the memory without degrading the image quality of the tiles or images corresponding to the amount of excess.

Another object of the present invention is to provide an image encoding method, apparatus and storage medium which, when an image that has been divided into a plurality of tiles is encoded tile by tile and stored in a memory having a predetermined capacity, or when a plurality of images are encoded separately and stored in a memory having a predetermined capacity, make it possible to store the tiles or images in the memory without degrading the image quality of specific tiles or images.

Accordingly, an object of the present invention is to provide an image encoding method, apparatus and storage medium which, when an image that has been divided into a plurality of tiles is encoded tile by tile and stored in a memory having a predetermined capacity, or when a plurality of images are encoded separately and stored in a memory having a predetermined capacity, make it possible to store encoded image data while suppressing overall image degradation by storing code of an amount that has exceeded the memory capacity upon dividing and allocating the code equally into codes of the individual tiles or images.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIGS. 7A to 7D are diagrams useful in describing the composition of a code stream obtained by encoding;

DESCRIPTION OF THE PREFERRED EMBODIMENTS

Preferred embodiments of the present invention will now be described in detail with reference to the accompanying drawings.

[First Embodiment]

Figure 1:
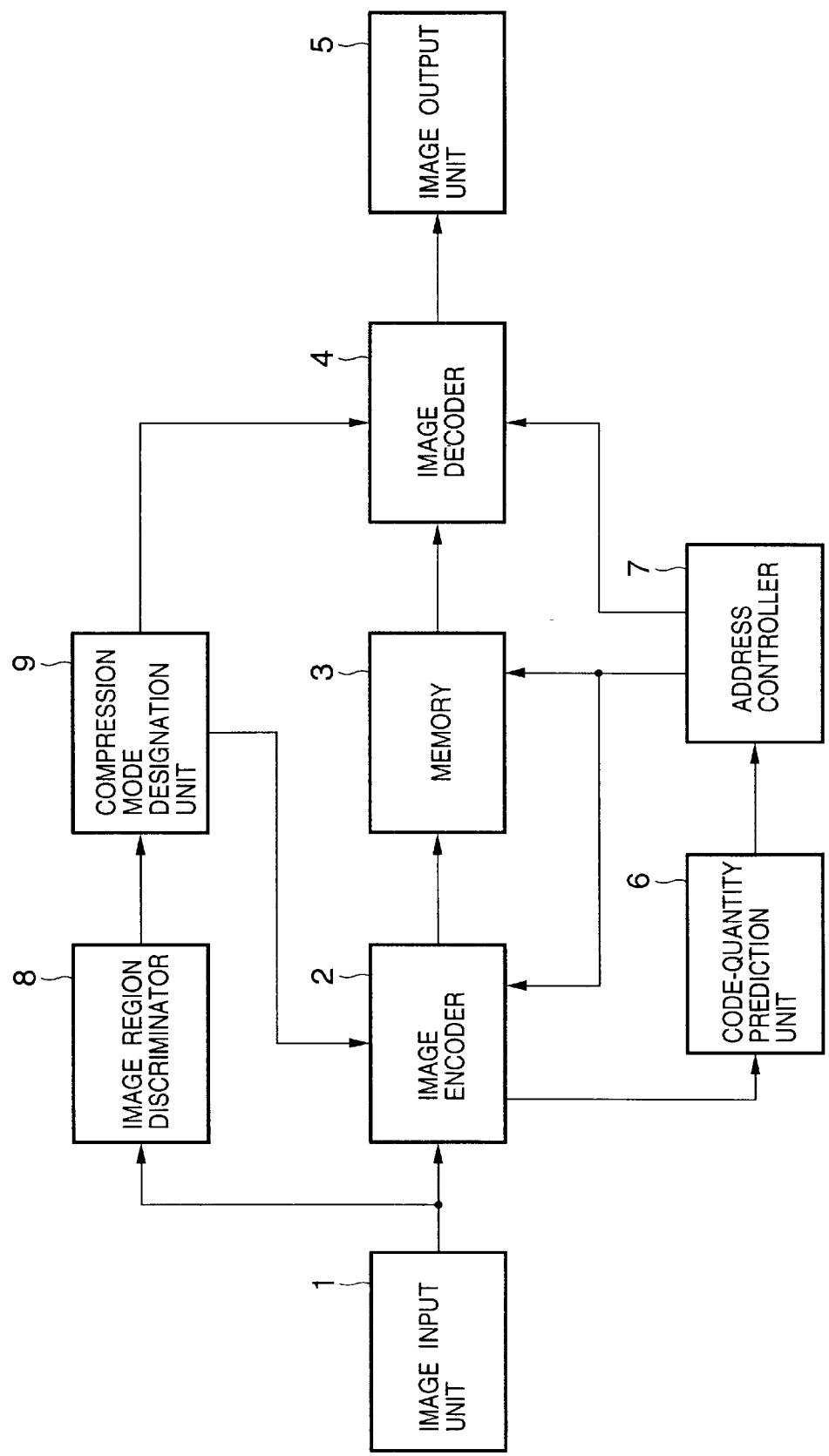
FIG. 1 is a block diagram illustrating the basic structure of an image processing apparatus according to a first embodiment of the present invention.

FIG. 1 is a block diagram illustrating the basic structure of an image processing apparatus according to a first embodiment of the present invention. It should be noted that a device such as a copier, printer or digital camera is a concrete example of an image processing apparatus according to the present invention.

Image data that has entered from the image input unit 1 is compressed and encoded by the image encoder 2 and the code stream produced by this encoding is stored temporarily in the memory 3. The code stream that has been stored in the memory 3 is output to the image decoder 4, which restores the code stream to a digital signal representing the original image and outputs the digital signal to predetermined media via the image output unit 5. The image input unit 1 is an image reader such as a scanner if the image processing apparatus is a copier or an image sensing device such as a CCD if the image processing apparatus is a digital camera. If the image processing apparatus is a digital camera, the image output unit 5 is a built-in, small-size liquid crystal monitor or an external computer connected via a prescribed interface. If the image processing apparatus is a printer, then the printing section that prints the image corresponds to the image output unit 5.

The operation of each of these blocks will now be described in detail.

Image data is output upon being divided by the image input unit 1 into rectangular tiles having a predetermined size.

Figure 2:
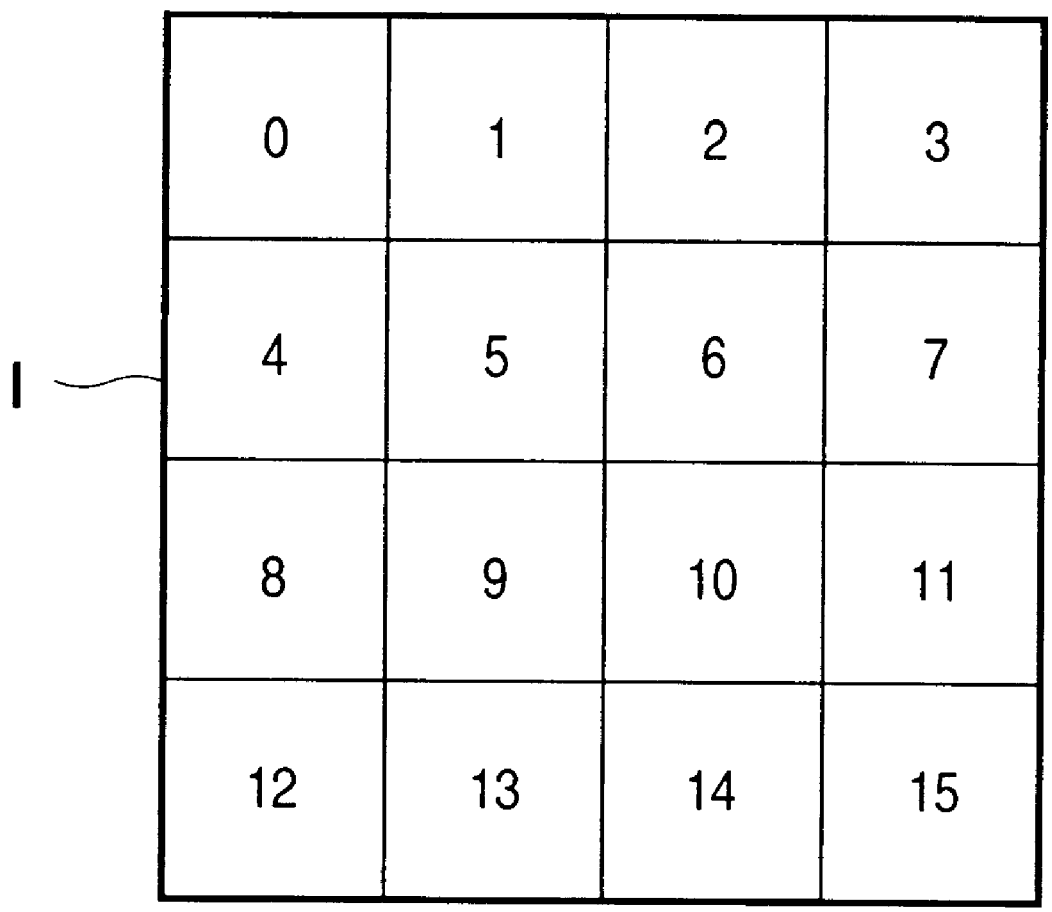
FIG. 2 is a diagram useful in describing an example of tiling of an image.

FIG. 2 is a diagram illustrating an example of an image that has been divided into a plurality of tiles. As shown in FIG. 2, the image data undergoing processing has been divided into 16 (=4×4) tiles each having the same size. The image data thus divided is input to the image encoder 2 and to an image region discriminator 8 successively tile by tile.

The image region discriminator 8 discriminates the kind of characteristic possessed by the image of each individually input tile and outputs the result of discrimination to a compression mode designation unit 9. In the example of the first embodiment, it is assumed that the image region discriminator 8 is for discriminating three types of images, namely a natural image, a binary image and a composite image. The discriminating method is not an object of the present invention and the details thereof need not be described. However, an example of such a method is to calculate a histogram of pixel values in an entered tile and utilize the histogram as a distribution.

The compression mode designation unit 9 decides the compression scheme and compression rate for the three above-mentioned types of image (natural, binary and composite) by a predetermined method and outputs the decided scheme and compression rate to the image encoder 2. The compression rate for each type of image may be one decided by a predetermined standard, or the compression rate may be varied in conformity with a user request when the image data is entered.

In the first embodiment, it is assumed that the compression rate is decided in advance. For example, it is assumed that "⅛" non-reversible compression has been designated for a natural image, "¼" non-reversible compression for a composite image and reversible compression for a binary image. The compression rate and the type of image determined by the image region discriminator 8 are output to the image encoder 2. The image data thus divided into multiple tiles by the image input unit 1 is compressed and encoded by the image encoder 2.

Figure 3:
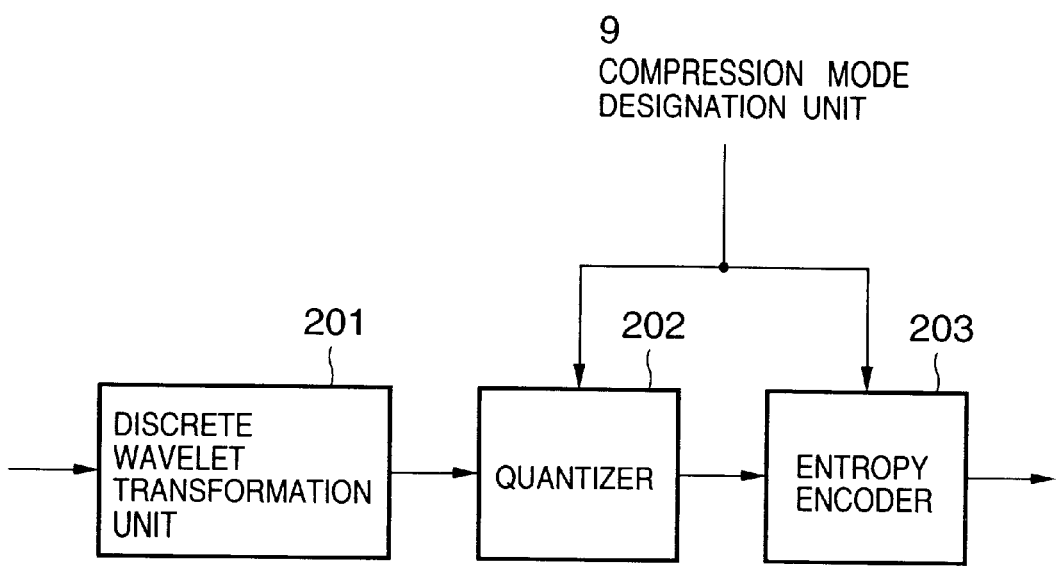
FIG. 3 is a block diagram illustrating the structure of an image encoder according to this embodiment.

FIG. 3 is a block diagram illustrating the structure of the image encoder 2 according to the first embodiment.

A discrete wavelet transformation unit 201 shown in FIG. 3 subjects the image data entered from the image input unit 1 to a two-dimensional discrete wavelet transform and outputs the sequence of coefficients obtained to a quantizer 202. Specifically, the discrete wavelet transformation unit 201 subjects the input image data to two-dimensional discrete wavelet transform processing, calculates the transformation coefficients and outputs the same.

Figure 4:
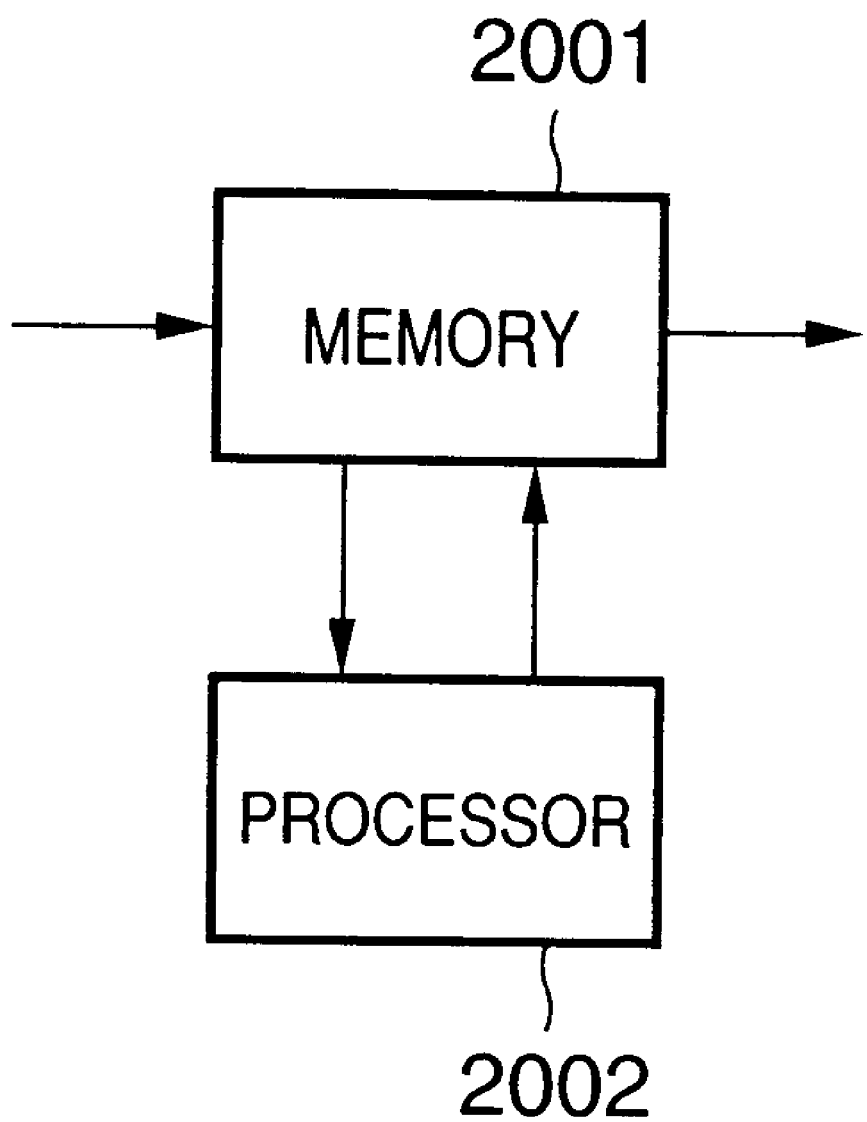
FIG. 4 is a block diagram illustrating the structure of a discrete wavelet transformation unit according to this embodiment.

FIG. 4 is a block diagram illustrating the basic structure of a discrete wavelet transformation unit 201 according to this embodiment. With reference to FIG. 4, the entered image data is stored in a memory 2001. The image data is read out of the memory 2001 successively and transformed by a processor 2002, after which the transformed data is written to the memory 2001 again. The processor 2002 executes one-dimensional discrete wavelet transformation by calculation in accordance with the following equations:

$$d(n)=x(2n+1)-\text{floor}[\{x(2n)+x(2n+2)\}/2] \qquad (1)$$

$$s(n)=x(2n)+\text{floor}[\{d(n-1)+d(n)\}/4] \quad (2)$$

where x(n) represents image data that is to be transformed, and s(n), d(n) represent low-pass and high-pass coefficients, respectively, based upon each discrete wavelet transform. A two-dimensional discrete wavelet transform implements a one-dimensional discrete wavelet transformation successively in horizontal and vertical directions of an image. As the details of this processing are well known, the processing will not be described here. Note, the discrete wavelet transform is not always performed by using the equations (1) and (2), and may be implemented by using various filtering coefficients and calculation methods in accordance with purposes of the transformation.

Figure 5:
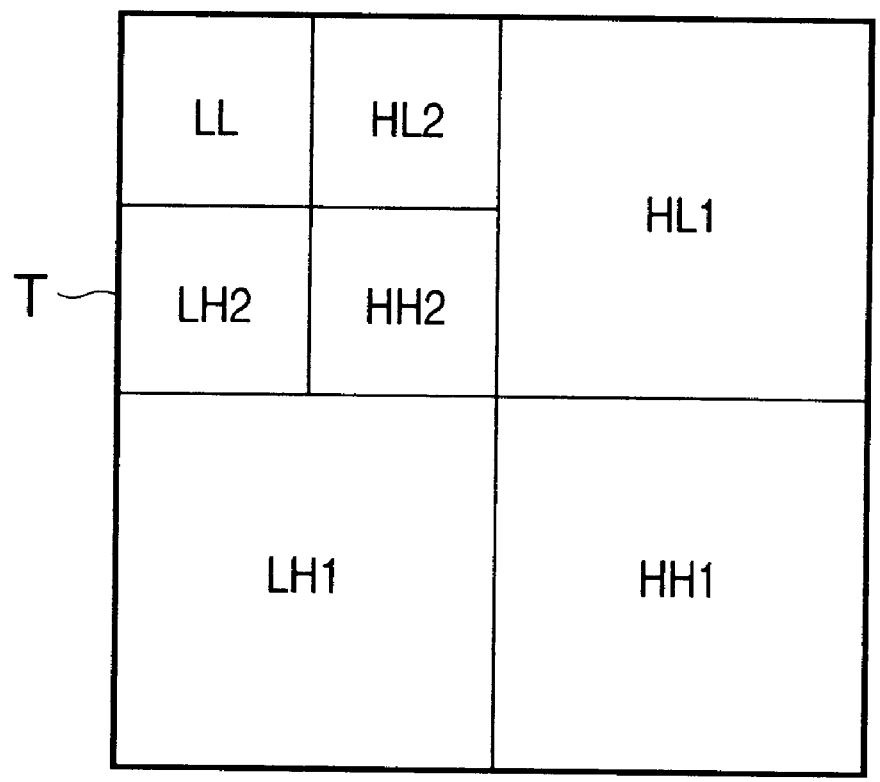
FIG. 5 is a diagram useful in describing subbands obtained by a discrete wavelet transformation.

FIG. 5 is a diagram illustrating an example of a group of transformation coefficients of two levels obtained by two-dimensional discrete wavelet transform processing. The image data is decomposed into coefficient sequences HH1, HL1, LH1, . . . , LL of different frequency bands. These coefficient sequences shall be referred to as "subbands" in the description that follows. The coefficients of each of the subbands are output to the quantizer 202.

The quantizer 202 quantizes the entered coefficients by a predetermined quantization step and outputs indices corresponding to the quantized values. Quantization is carried out based upon the following equations:

$$q=\text{sign}(c)\text{floor}\{\text{abs}(c)/\Delta\} \quad (3)$$

$$\text{sign}(c)=1;\ c\geq 0 \quad (4)$$

$$\text{sign}(c)=-1;\ c<0 \quad (5)$$

where c represents a coefficient that undergoes quantization. Further, in this embodiment, in order to realize a tile compression rate based upon the compression mode designation unit 9, it is assumed that the quantization step $\Delta$ has been selected in such a manner that encoding at the prescribed compression rate can be discontinued by bit-plane encoding in an entropy encoder 203, described below. Note, the quantization is not always necessary and the coefficients obtained by the discrete wavelet transform may be used as the quantization indices in the following process.

The entropy encoder 203 decomposes entered the quantization indices into bit planes, applies binary arithmetic encoding on a per-bit-plane basis and outputs a code stream.

Figure 6:
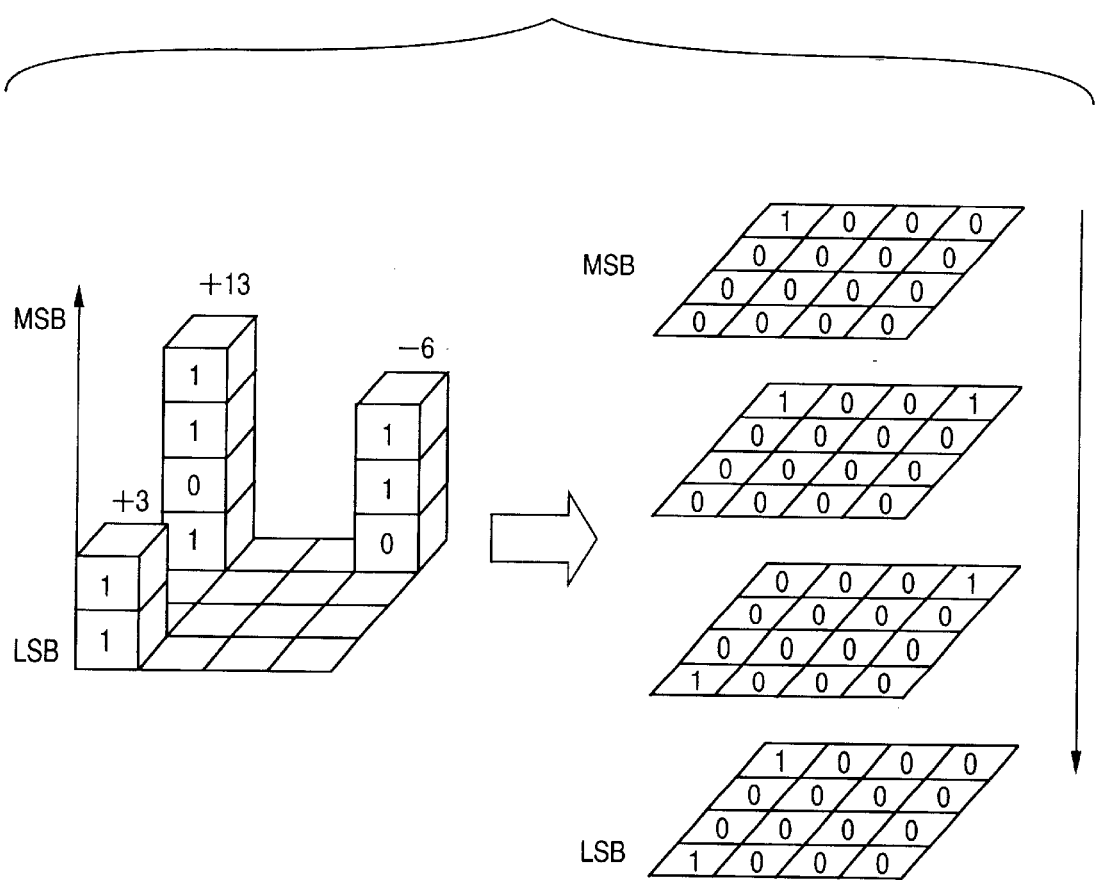
FIG. 6 is a diagram useful in describing bit-plane encoding.

FIG. 6 is a diagram useful in describing the operation of the entropy encoder 203 according to this embodiment. In this embodiment, three non-zero quantization indices exist in a region within a subband having a size of 4×4, and the values of these indices are +13, −6 and +3. The entropy encoder 203 obtains a maximum value M by scanning this region and, in accordance with the following equation, calculates a number S of bits necessary to express the maximum quantization index:

$$S=\text{ceil}[\log_2\{\text{abs}(M)\}] \quad (6)$$

where ceil(x) represents the smallest integral value that is greater than x. In FIG. 6, the maximum coefficient value is "13" and therefore the value of the bit count S is "4" and the 16 quantization indices in the sequence are processed in units of the four bit planes, as shown on the right side of FIG. 6. First, the entropy encoder 203 applies binary arithmetic encoding to each bit of the most significant bit plane (represented by MSB in FIG. 6) and outputs the encoded bits as a bit stream. Next, the bit plane is lowered by one level and the process is repeated. This processing is repeated until the bit plane of interest reaches the least significant bit plane (represented by LSB in FIG. 6), with each bit of the bit planes being encoded and output. When the first non-zero bit is detected in the scanning of the bit planes, then the sign of this quantization index undergoes entropy encoding immediately thereafter.

Meanwhile, as shown in FIG. 3, the type of image and compression rate are input to the entropy encoder 203 from the compression mode designation unit 9. On the basis of these input values, the entropy encoder 203 counts the output amount of code and halts encoding processing when the amount of code attains a value applicable to the compression rate designated by the compression mode designation unit 9. As a result, the compression rate of the applicable tile is controlled to a predetermined value.

FIGS. 7A to 7D are schematic views representing the structure of a code stream thus generated and output by the image compression unit 3.

FIG. 7A illustrates the structure of an overall code stream, in which MH represents a main header, TH a tile header and BS a bit stream. As shown in FIG. 7B, the main header MH possesses the size of the image to be encoded (namely the numbers of pixels in the horizontal and vertical directions of the image), tile size for when the image is divided into a plurality of tiles constituting rectangular areas, number of components representing the number of each of the color components, and component information representing the size and bit precision of each component.

The structure of the tile header TH is shown in FIG. 7C. The tile header TH includes tile length, which contains the bit-stream length and header length of the particular tile, and an encoding parameter for the tile. The encoding parameter includes the level of the discrete wavelet transform, the type of filter, etc.

FIG. 7D illustrates the structure of a bit stream in this embodiment.

As shown in FIG. 7D, bit streams are grouped on a per-bit-plane basis and are arranged from a high-order bit plane to a low-order bit plane. In each bit plane, the results of encoding the bit plane of the quantization indices in each subband are arranged successively on a per-subband-basis. In FIG. 7D, S represents the number of bits necessary to express the largest quantization index. The code streams thus generated are output to the memory 3 to be stored.

Figure 9A:
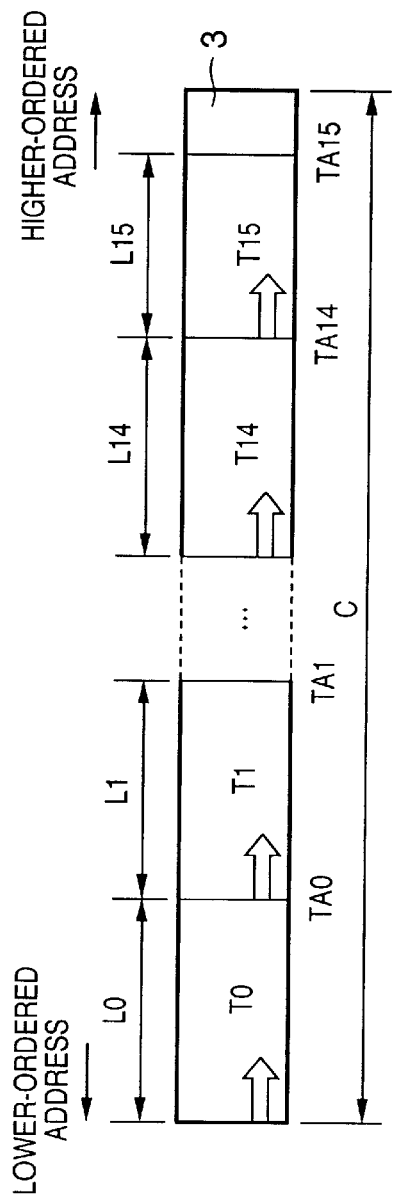
FIGS. 9A and 9B are diagrams useful in describing the storage of code streams of individual tiles in memory.

FIG. 9A is a diagram useful in describing the arrangement in memory 3 of the bit streams generated tile by tile according to the method set forth above.

As shown in FIG. 9A, the bit streams of each of the tiles are arranged successively in the direction of lower- to higher-order addresses of memory 3 successively starting from tile 0 (T0). Here the bit-stream length (Li: i=0 to 15) of each tile differs depending upon the tile because the compression rate differs depending upon the type of tile image, as mentioned earlier. In FIG. 9A, the bit streams from tile 0 (T0) to tile 15 (T15) all fit in the memory 3. However, if reversible encoding has been performed over the entire range of the entered image, there is a possibility that the total bit-stream length will exceed the capacity of memory 3. In FIG. 9A, the terminus address TAi (i=0 to 15) indicates the final address of memory 3 storing the bit streams of each of the tiles. The operation performed by the image processing apparatus of the first embodiment in such case will now be described.

The code from the image encoder 2 is input to a code-quantity prediction unit 6, which counts the code tile by tile. The amount of code of the immediately preceding tile and a cumulative value of amounts of code of tiles encoded up to the immediately preceding tile have been stored in the code-quantity prediction unit 6. On the basis of the cumulative value and the amount of code of the preceding tile, the code-quantity prediction unit 6 predicts the amount of code of the tile currently undergoing processing and judges whether the code of this tile undergoing processing can be stored in the memory 3 without causing overflow.

The prediction method may entail making a judgement assuming that the amount of code of the present tile is equal to that of the immediately preceding tile or finding the amount of code of the present tile by extrapolation from a change in the cumulative amount of code.

Figure 8:
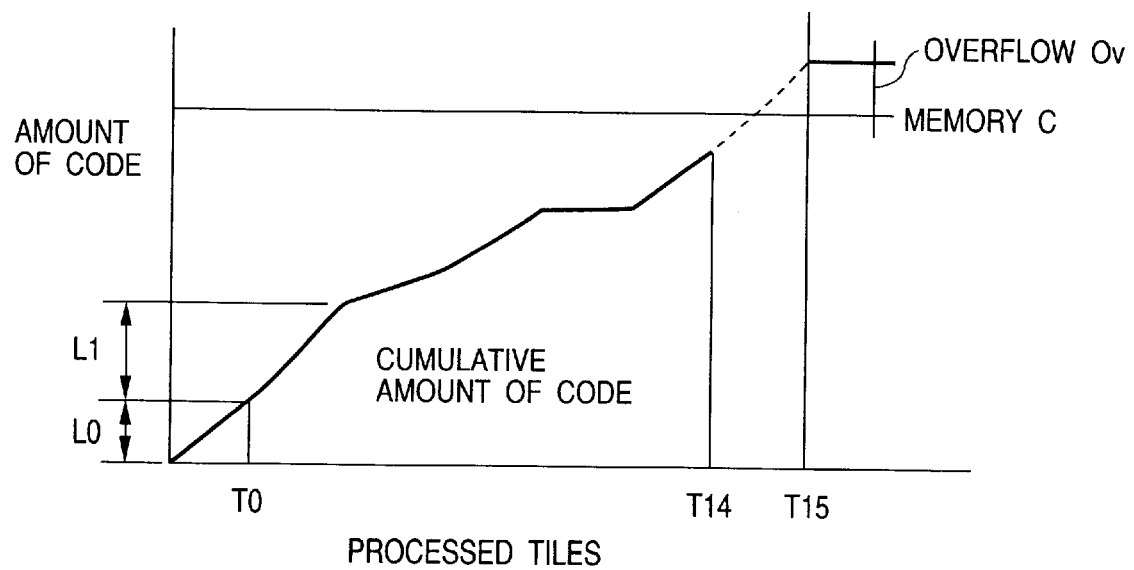
FIG. 8 is a diagram useful in describing prediction of amount of code on a tile-by-tile basis.

FIG. 8 is a diagram illustrating the relationship between amount of code and processed tiles in a case where overflow has occurred in memory 3.

In the example illustrated in FIG. 8, the cumulative amount of code exceeds the total memory capacity of memory 3 and overflows owing to encoding of tile 15 (T15). Accordingly, the code-quantity prediction unit 6 outputs, to an address controller 7, an overflow quantity Ov obtained by prediction and the amount of code of the immediately preceding tile. If overflow does not occur, the value of the overflow quantity Ov becomes zero.

The address controller 7 controls the address of the memory 3 when a code stream output by the image encoder 2 is written to the memory 3. In a case where the code streams of all tiles can be stored in the memory 3, the address controller 7 generates addresses in such a manner that the code streams will be stored in order in the direction of lower to higher-order addresses of memory 3 in the manner indicated by the arrows in each of the tiles in FIG. 9A. However, if the overflow quantity Ov that enters from the code-quantity prediction unit 6 is not zero (overflow is predicted), then the amount 90 of overflow is divided and the write addresses are generated in such a manner that the divided amounts of code will be written over the tile code streams in unit of byte, which have already been stored in the memory 3, starting from the rearmost end of each code stream.

The operation of the address controller 7 which generates such write addresses will now be described in detail.

Figures 10A, 10B:
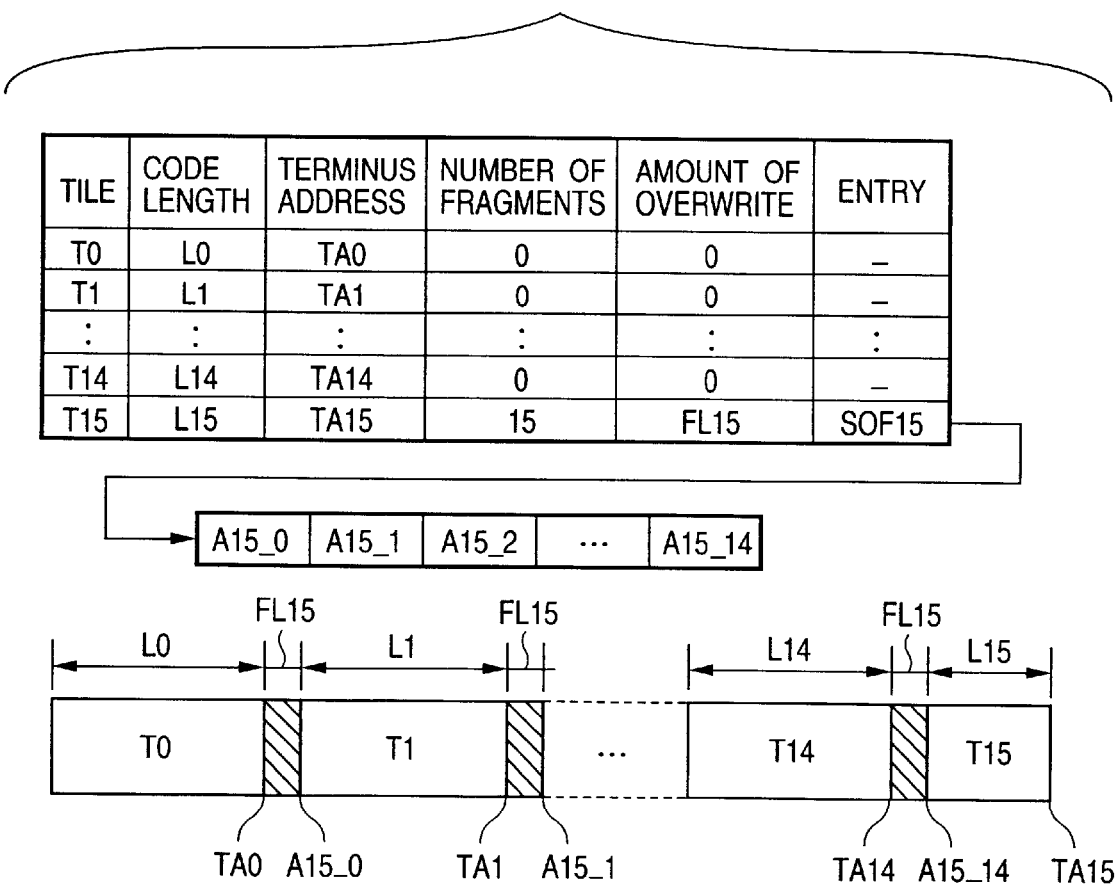
FIGS. 10A and 10B are diagrams useful in describing a method of storing code streams of individual tiles implemented by an address controller according to the first embodiment.

FIGS. 10A and 10B are diagrams useful in describing the operation of the address controller 7 according to the first embodiment of the present invention.

The address controller 7 retains the positions at which the tile code streams stored in memory 3 are being held as well as information necessary for address control. FIG. 10A represents the information. The code-stream length (code length) and terminus address (Tai) of each tile represent the position of the code stream in memory 3. The number of fragments indicates whether the code stream of the particular tile has been dispersed with in the memory 3. If the value is "0", this indicates that the code stream has been stored in a continuous storage area of the memory 3. Accordingly, if the status is such that the code streams of all tiles have been stored in memory 3, as depicted in FIG. 9A, then all of the fragment numbers will be "0", as shown in FIG. 10A.

Figure 9B:
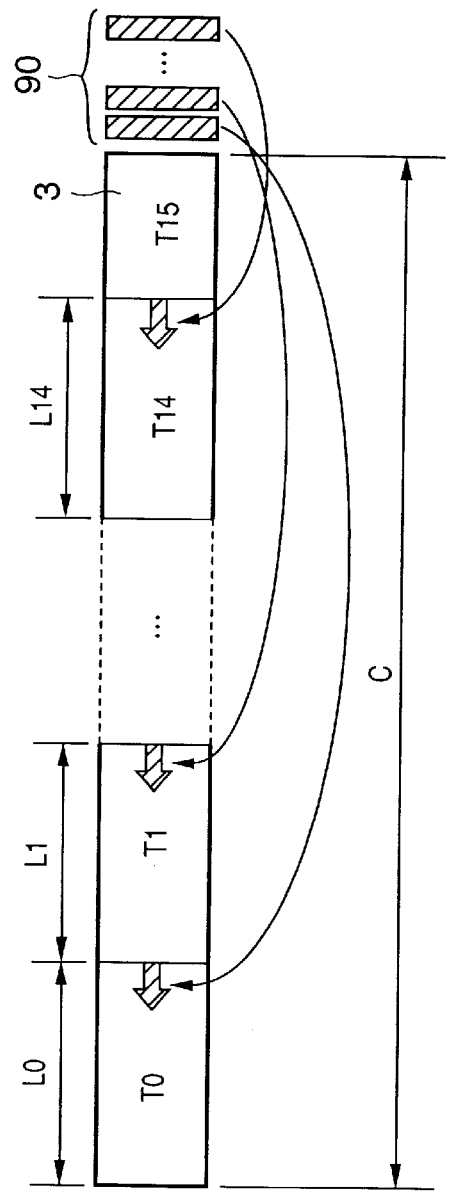

On the other hand, if the code stream of a tile (tile T15 in the example of FIGS. 9A and 9B) cannot be stored in memory 3 as a continuum, then the code stream is stored upon being split into a plurality of fragments, as shown in FIG. 9B, and the number of fragments of this tile takes on a value of "1" or greater. Amount of overwrite indicates the size of each fragment in a case where a code stream is dispersed within the memory 3. Entry is an address to a list in the address controller 7 retaining the starting address of each fragment.

In a case where the code streams of all tiles of an input image can be stored in the memory 3, as shown in FIG. 9A, the numbers of fragments and amounts of overwrite are all "0" and the entries are set to null values. However, in a case where a tile of an image cannot fit in the memory 3, as shown in FIG. 9B, the code stream of this tile is split and is written over code streams, which have already been encoded and placed in memory 3, in a manner to be described below.

Specifically, the address controller 7 finds the number of fragments from the number of tiles encoded previously. In this example, the code stream of the final tile (T15) overflows and therefore this code stream is to be written over the preceding 15 tiles. The number of fragments, therefore, is 15. Further, the address controller 7 calculates the amount of overwrite from the overflow quantity Ov that has entered from the code-quantity prediction unit 6. In the first embodiment, the overwrite amount (FL15) is calculated as indicated by Equation (7) below in such a manner that the code stream will be written equally over each of the tiles that were obtained by dividing the image. Since the image is this example has been divided into 16 tiles and the overwrite amount Ov is evenly divided into 16 tiles including the overflow tile T15, FL15 is calculated as follows:

$$FL15 = Ov/16 \qquad (7)$$

However, the tile T15 is not over written and is reduced by FL15 from the last end of overflow code stream such that the codes of the tile T15 substantially become invalid as the same as that of other tiles.

Next, on the basis of the terminal address (TAi) of each tile, the address controller 7 calculates write addresses for when the split code streams of the overflow tile are written over respective ones of the code streams of the tiles 0 (T0) to 14 (T14). That is, in this embodiment, since the tile whose code stream will be split is singular (T15), the write address of each tile fragment is equal to the terminus address of the tile over which the tile fragment is to be written. If we let A15_n (n=0 to 14) represent the write address of each tile fragment, the positional relationship of the addresses in memory will be as shown in FIG. 10B. These addresses are stored in a memory (not shown) in the address controller 7. Meanwhile, the code length and terminus address of each tile that has been overwritten with a tile fragment is corrected to a value obtained by subtracting the overwrite amount FL15. Note, in the tile T15, the code length is L15 and the number of fragments and the amount of overwrite are calculated based on FL15.

It should be noted that these operations start at the same time as the encoding of the tile 15 (T15) in this embodiment. For as long as the code stream of tile 15 (T15) generated by the image encoder 2 can be stored in its entirety in the memory 3, the address controller 7 generates write addresses in the memory 3 in such a manner that code streams will be written to the memory 3 in the direction of lower- to higher-order addresses. Then, immediately before the writing of the code stream of tile 15 causes overflow, the address controller 7 changes the method in which memory 3 is addressed and starts generating addresses in such a manner that the code stream of tile 15 (T15) will be written over the code streams of tiles 0 to 14 previously encoded and stored.

More specifically, as shown in FIG. 10B, the overwriting of the code stream of tile 0 (T0) is carried out in the direction of higher- to lower-order addresses of the memory 3 in unit of byte, with A15_0 serving as the starting point, until the amount of code stream written over tile 0 becomes FL15. Overwrite thenceforth is performed in similar fashion for tiles 1 to 14. Thus, at the moment the overwriting of code stream of amount FL15 on tile 14 (T14) from A15_14 ends, the address controller 7 sends a control signal to the image encoder 2 to halt the encoding of tile 15.

By thus obtaining code streams by the encoding of an image and storing these code streams in the memory 3, code-stream overflow in the memory 3 is avoided and a marked decline in the image quality of final tile of the decoded image is prevented.

Operation when code streams that have been stored in the memory 3 are decoded to present a displayed image will now be described in detail.

The basic flow when an encoded image is decoded and output is as follows: The code streams of respective ones of the tiles that have been stored in the memory 3 are read out in order, the code streams are decoded by the image decoder 4 to reconstruct the image, and the reconstructed image is output by the image output unit 5.

If, when code streams are read out of the memory 3, the situation is such that the code streams were stored in memory 3 without the splitting of a code stream, as shown in FIG. 9A, then the address controller 7 generates read-out addresses of memory 3 in such a manner that the code streams will be read out in order starting the beginning of the memory 3. On the other hand, if a tile was stored in the memory 3 upon being partially fragmented in the manner described earlier, then addresses are generated in the manner set forth below.

First, assume that the code streams in the memory 3 have been arrayed as shown in FIG. 10B. That is, assume that the code stream of tile 15 was split and that the other code streams were stored in order starting from the beginning of the memory 3. In such case the address controller 7 generates read-out addresses from tile 0 (T0) to tile 14 (T14) based upon the code length Li and terminus address TAi (i=0 to 14) of each tile. Since the number of fragments of each tile of tiles 0 to 14 is "0", the direction in which read-out is performed is from addresses of lower to higher order in the memory 3. In the case of the tile 15 (T15), however, the number of fragments is not "0" and therefore addresses are generated as follows:

First, the address controller 7 counts the cumulative amount of code (L0+L1+ . . . L14) of tiles read out previously. If the count is indicative of a value that is less than the memory capacity of the memory 3, read-out addresses continue to be generated in the direction of higher-order addresses of the memory 3. When read-out reaches the final address of the memory 3, the addressing method is changed as follows: The address controller 7 refers to an entry SOF15 of tile 15, reads out the overwrite starting points (A15_0 to A15_14) at which the split code streams were written over the respective tiles, and generates read-out addresses in the opposite direction (in the direction of higher- to lower-order addresses) from each overwrite starting point. By executing this processing for the amount (which corresponds to 90 in FIG. 9B) of fragmented code stream, the code stream of the fragmented tile (T15) can be output to the image decoder 4.

Figure 12:
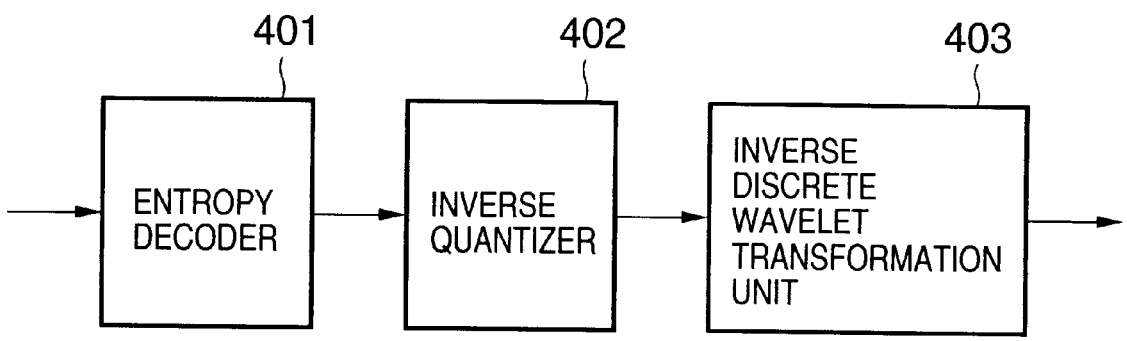
FIG. 12 is a block diagram illustrating the structure of an image decoder according to this embodiment.

FIG. 12 is a block diagram illustrating the structure of the image decoder 4 according to this embodiment. The image decoder 4 includes an entropy decoder 401, an inverse quantizer 402 and an inverse discrete wavelet transformation unit 403.

The entropy decoder 401 subjects an encoded bit stream applied thereto to decoding on a per-bit-plane basis and outputs the result. The decoding procedure at such time is illustrated in FIG. 13.

Figure 13:
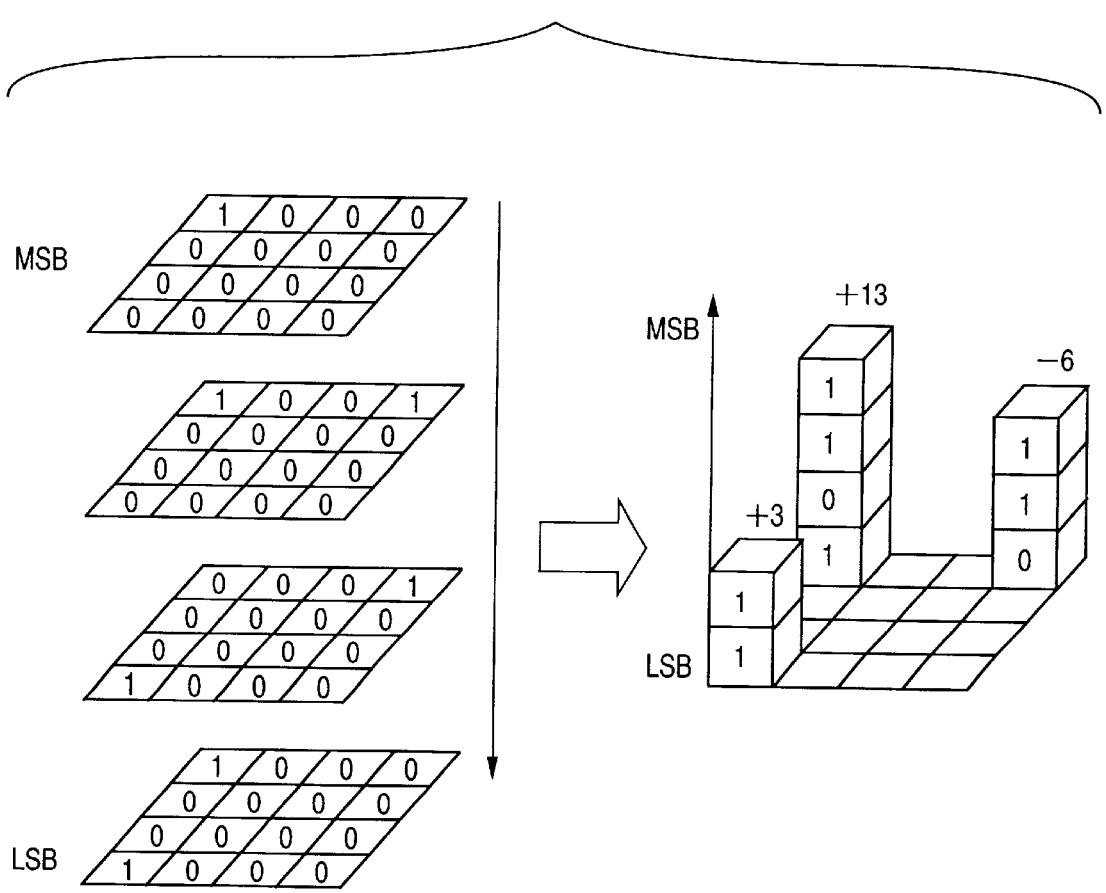
FIG. 13 is a diagram useful in describing bit-plane decoding.

FIG. 13 illustrates the flow through which one region of a subband to be decoded is successively decoded on a per-bit-plane basis and quantization indices are finally restored. The bit planes are decoded in the order indicated by the downwardly directed arrow on the left side of FIG. 13. The quantization indices that have been restored are output to the inverse quantizer 402.

The inverse quantizer 402 restores discrete wavelet transform coefficients from the quantization indices, which enter from the entropy decoder 401, in accordance with the following equations:

$$c'=\Delta \times q; \quad q \neq 0 \tag{8}$$

$$c'=0; \quad q=0 \tag{9}$$

where q represents a quantization index and Δ a quantization step. The quantization step Δ has a value the same as that used when encoding was performed. Further, c' represents a restored transformation coefficient. This is obtained by restoring a coefficient represented by s or d at the time of encoding. The transformation coefficient c' is output to the inverse discrete wavelet transformation unit 403.

Figure 14A:
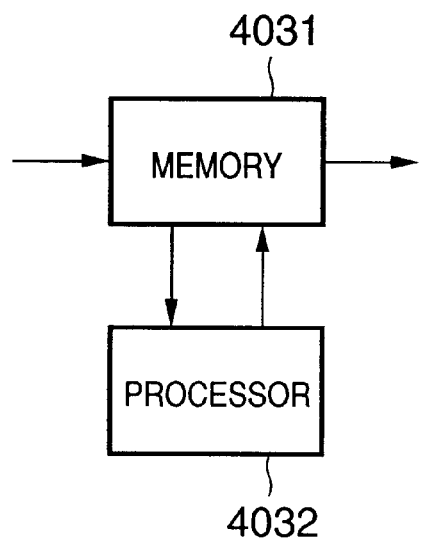
FIGS. 14A and 14B are block diagrams illustrating the structure of an inverse discrete wavelet transformation unit.
Figure 14B:
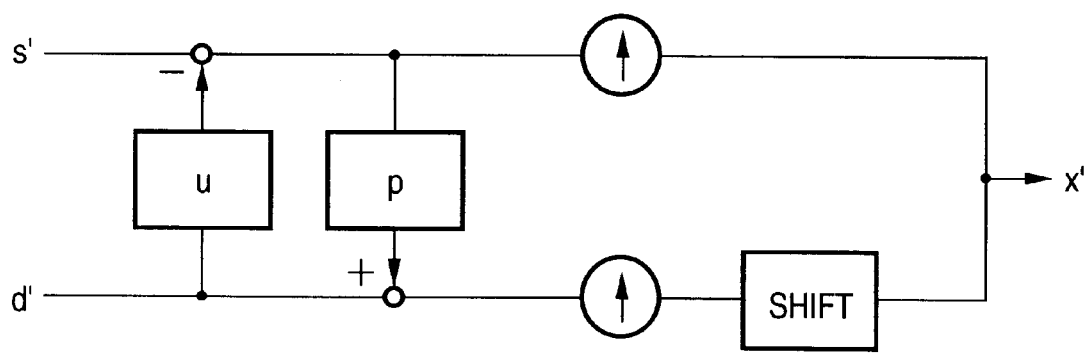

FIGS. 14A and 14B are block diagrams illustrating the construction and processing of the inverse discrete wavelet transformation unit 403.

In FIG. 14A, entered transformation coefficients are stored in a memory 4031. A processing unit 4032 implements a one-dimensional inverse discrete wavelet transform, reads the transformation coefficients out of the memory 4031 successively and performs processing, thereby executing a two-dimensional inverse discrete wavelet transform. A two-dimensional inverse discrete wavelet transform is implemented through a procedure that is the reverse of the forward transform in the discrete wavelet transformation unit 201 of FIG. 3. The details of this are well known and need not be described. FIG. 14B shows processing blocks of the processing unit 4032. Here the entered transformation coefficients are subjected to the processing of two filters u and p. After up-sampling is performed, the coefficients are superimposed and the processing block outputs an image signal x'. These processes are executed in accordance with the following equations:

$$x'(2n)=s'(n)-\text{floor}[\{d'(n-1)+d'(n)\}/4] \tag{10}$$

$$x'(2n+1)=d'(n)-\text{floor}[\{x'(2n)+x'(2n+2)\}/2] \tag{11}$$

Here the discrete wavelet transforms in the forward and reverse directions in accordance with Equations (1), (2) and Equations (10), (11) satisfy the conditions for full reconstruction. In this embodiment, therefore, the encoding is reversible encoding in which, if the quantization step Δ is "1" and all bit planes have been decoded in the decoding of the bit planes, the reconstructed image signal x' will agree with the signal x representing the original image.

In this embodiment, the fact that the code stream of tile 15 (T15) is written over the other tiles means that each code stream will have a length different from that which prevailed at the time of encoding. More specifically, though the code streams have each been shortened by an amount equivalent to FL15, the address controller 7 reports the terminal ends of the code streams to the image decoder 4. When the image decoder 4 detects the terminal end of a code stream, it immediately terminates decoding processing and outputs the image data that has been decoded at this point in time to the image output unit 5.

As shown in FIGS. 7A to 7D, the code streams are structured such that the coefficients obtained by the discrete wavelet transformation are arrayed starting from the bit planes of higher order. As a consequence, if decoding processing is discontinued in mid-course, the bit planes of lower order will not be decoded. However, values corresponding to ½ of a range of coefficients obtained from decoded bit planes can be inserted in these portions not decoded.

As a result of the above-described processing, an image is reconstructed by the image decoder 4 and output to the image output unit 5. Here the image output unit 5 may be an image display unit such as a monitor or a storage device such as a magnetic disk.

In the description rendered above, the tile that overflows from the memory 3 when image data is encoded and stored is only the final tile. However, overflow of a plurality of tiles is possible. The processing executed in such case will now be described.

Figure 11:
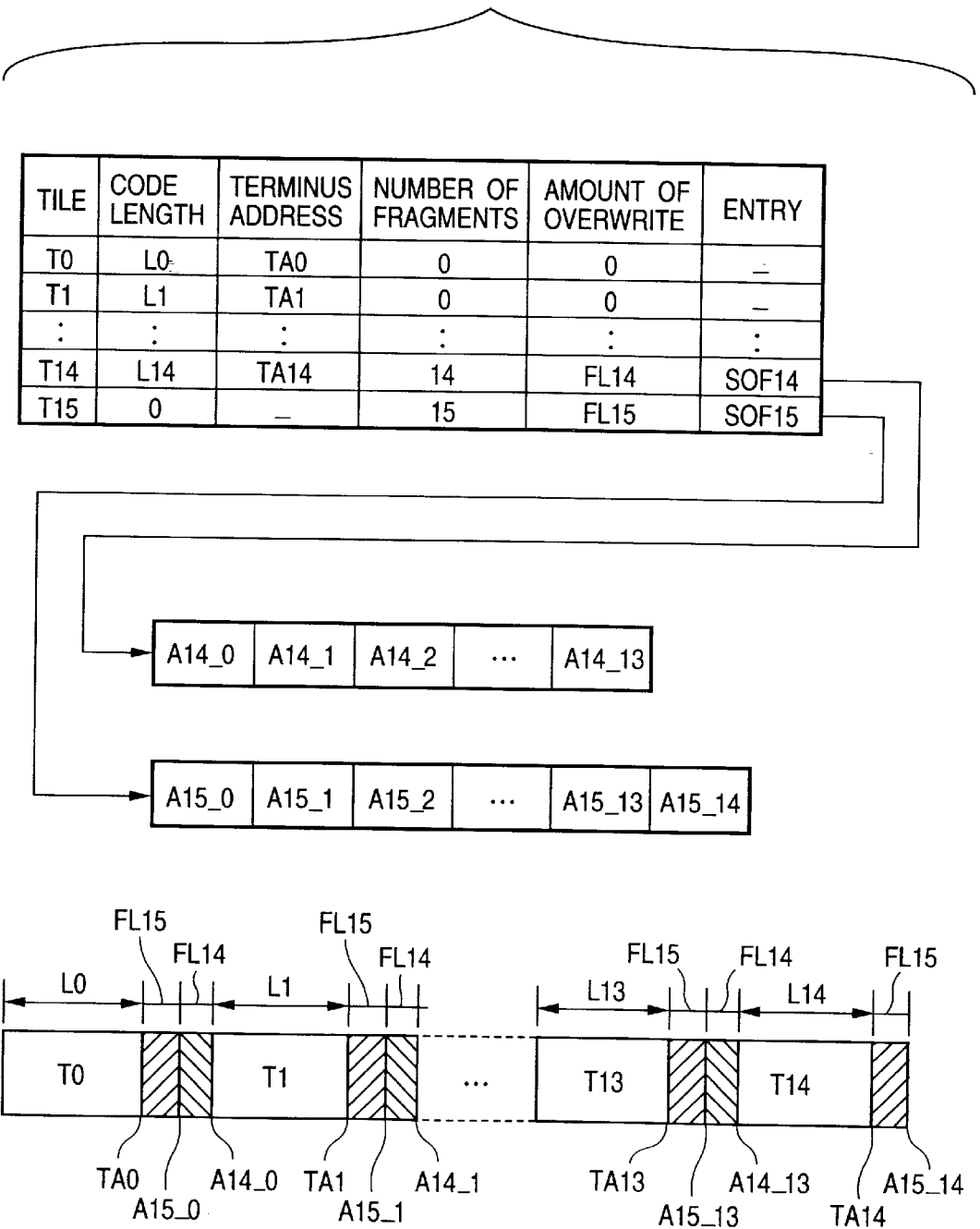
FIG. 11 is a diagram useful in describing another example of a method of storing code streams of individual tiles implemented by an address controller according to the first embodiment.

FIG. 11 is a diagram useful in describing the operation of the address controller 7 when the code streams of two tiles, namely tiles 14 (T14) and 15 (T15), overflow. In FIG. 11, the splitting of the code stream for tile 14 and the writing of the fragments thereof over the respective ones of the tiles (T0 to T13) preceding tile 14 are executed in a manner similar to that described earlier taking tile 15 as the example. The details thereof need not be described again.

If the code stream of tile 15 (T15) is to be written to the memory 3 next, there will already be no space available in the memory 3. The code stream of tile 15 (T15) therefore is split into 15 fragments and the fragments are written over the respective code streams of tiles 0 (T0) to 14 (T14) in a manner similar to that described above. In this case, the amount of over write (FL15) is defined as an equation (12) as follows:

$$FL15 = (Ov - FL14)/16 \tag{12}$$

Accordingly, as shown in FIG. 11, part of the code stream of tile 14 (T14) is situated at the tail end of the memory 3 and the remaining area of this tile is split into a plurality of fragments and the fragments are stored upon being distributed over the tiles T0 to T13. The code stream (FL15) of tile 15 (T15) is split into 15 segments and these segments are written over the tail ends of respective ones of tiles 0 to 13, in a form neighboring the fragmented code streams (FL14) of the tile 14 (T14), starting from addresses $A15\_i$ (i=0 to 13) in the direction of the addresses of lower order. Note, in the tile T14, FL15 is only overwritten.

This is accompanied by retaining the addresses (SOF14, SOF15) of the overwrite starting addresses of the code-stream fragments in the entries of tiles 14 (T14) and 15 (T15), as shown in FIG. 11. Further, the code lengths of the tiles (T0 to T13) over which the code-stream fragments are written take on values obtained by subtracting the overwrite amounts (FL14 and FL15) of the two overflow tiles (T14 and T15). In a case where more number of tiles exit, code-stream of the overflow tile is divided and the code-stream fragments are arranged, as described above. The amount of overwrite is calculated based on the amount of overwrite of an already divided tile. Namely, in the equation (12), a value obtained by subtracting the cumulative amount of the preceding overwrite amounts from the amount of code of the tile is uniformly divided to be dispersed.

Figure 15:
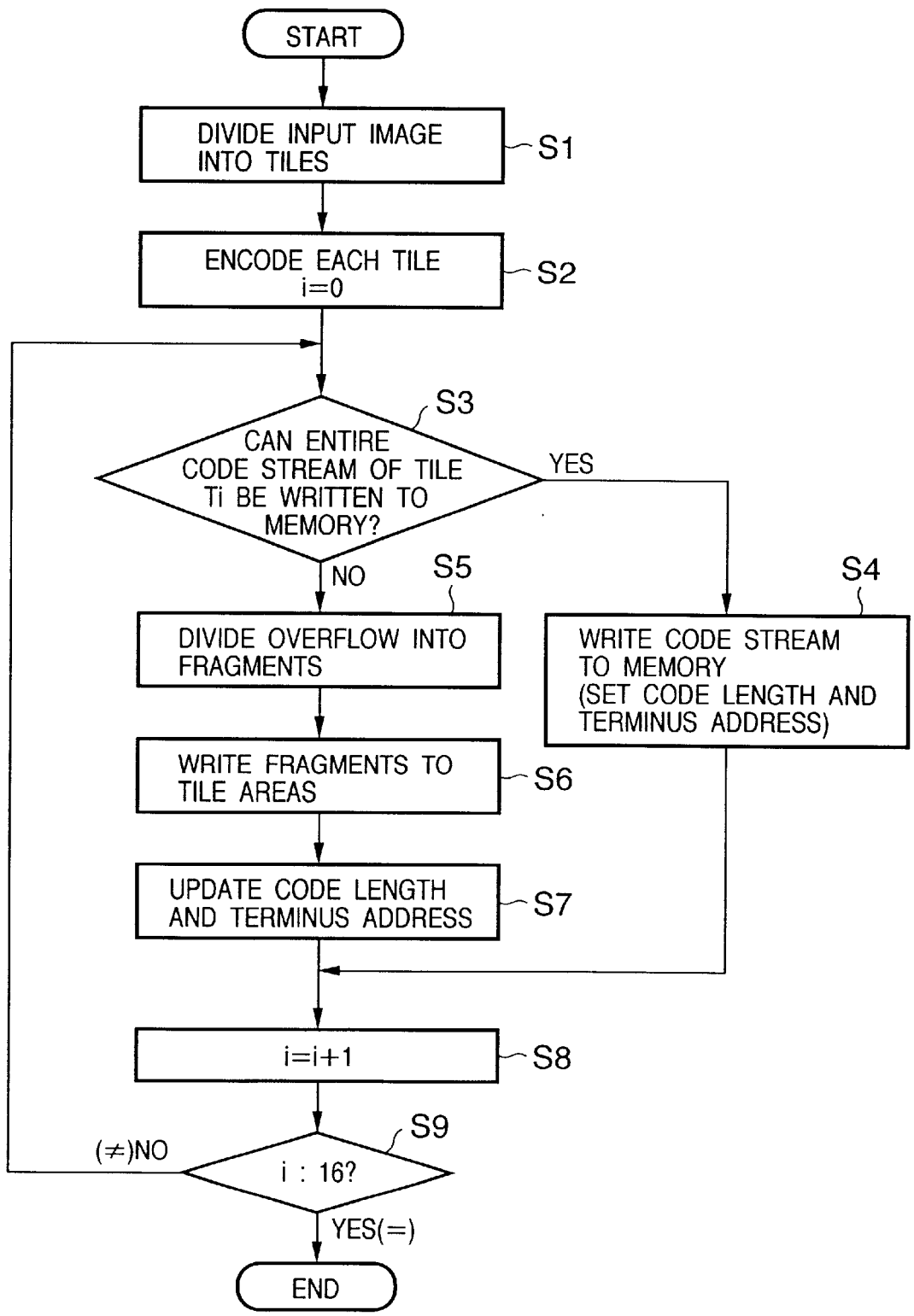
FIG. 15 is a flowchart illustrating processing for encoding data and storing the encoded data in a memory according to the first embodiment of the present invention.

FIG. 15 is a flowchart for describing encoding processing and processing for storing code in the memory 3 according to the first embodiment.

Step S1 of the flowchart calls for an input image to be divided into a plurality of tiles and for the image data of each tile to be input. Control then proceeds to step S2, at which the image data of each file is successively encoded. The code stream of the initial file that has been encoded is entered and it is determined at step S3 whether the entire code stream of this tile can be stored in the memory 3. If the entire code stream can be stored ("YES" at step S3), control proceeds to step S4, at which the encoded code stream is stored in memory 3. Here the code length of this code stream and the terminus address thereof in memory 3 are set.

When it is predicted that the entire code stream of this tile cannot be stored in the memory 3 ("NO" at step S3), control proceeds to step S5. Here the portion of this code stream that will overflow because it cannot be stored in the memory 3 is split by the number of tiles. Then, at step S6, the code-stream fragments obtained are written to the code-stream areas of respective ones of the tiles in the direction from higher- to lower-order addresses (see FIG. 10B). This is followed by step S7, at which the code length and terminus address of each tile is updated in conformity with the writing of the codes to memory 3. Control then proceeds to step S8, at which the value $i$ in a counter which counts the number of tiles is incremented by +1, and then to step S9, at which it is determined whether the value of the count $i$ has reached 16 or not (see FIG. 2). If $i$ has not reached 16 ("NO" at step S9), control returns to step S3 and processing from this step onward is executed again. If a "YES" decision is rendered at step S9, the processing of FIG. 15 is exited.

Thus, in accordance with the first embodiment as described above, when image data is divided into a plurality of tiles, the tiles are encoded independently and the code is stored in a memory, a code stream that overflows from the memory is split into equal fragments and the fragments are written over the code streams of tiles, which have already been encoded and stored, in the opposite direction toward a starting address from the terminus addresses of these code streams. As a result, the writing of codes to a memory having a limited storage capacity can be performed without degrading the image quality of reproduced image corresponding to some of the tiles.

[Second Embodiment]

The first embodiment described above is such that when the memory 3 is about to overflow, the amount of overflow is split equally into fragments and the fragments are written over the code streams of tiles already written to the memory. However, there are occasions where it is desired that there be no decline in the image quality of a number of portions present in an image. For example, in the first embodiment, each tile is classified as being one of three types, namely natural, composite or binary, and a different compression rate is set for each type. There are instances where there is a need to so arrange it that the image quality of a specific type of image, e.g., the binary image, will not be degraded.

The second embodiment will be described with regard to a method of writing code streams to a memory of a fixed capacity adaptively in accordance with the type of image. The components of the image processing apparatus of the second embodiment as well as the functions of these components are basically the same as those of the first embodiment. Accordingly, only the aspects of the second embodiment that differ from those of the first embodiment will be described.

In the second embodiment, it is assumed that a binary image contained in an image undergoes reversible encoding and that it is necessary to assure the reversibility of a decoded image with respect to the tiles that correspond to the binary image. The image entered from the image input unit 1 undergoes image-type discrimination in the image region discriminator 8 and the compression rate of the relevant tiles is designated by the compression mode designation unit 9. In the second embodiment, the result of this processing is output to the image encoder 2 and address controller 7.

The image encoder 2 and code-quantity prediction unit 6 operate in the same manner as described in connection with the first embodiment. Unlike the first embodiment, on the other hand, the address controller 7 stores flags which indicate, depending upon the types of tiles, whether these tiles are to be overwritten.

Figure 16:
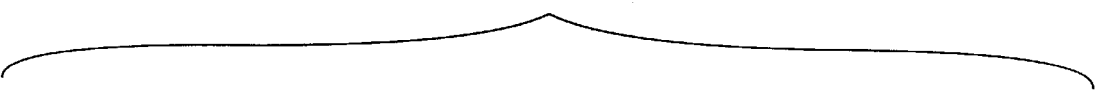
FIG. 16 is a diagram useful in describing the operation of an address controller according to a second embodiment of the present invention.
Figure 16:
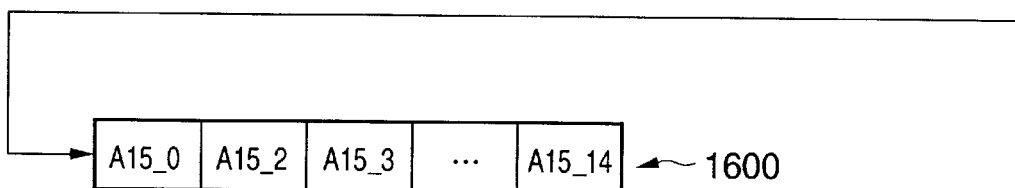
Figure 16:
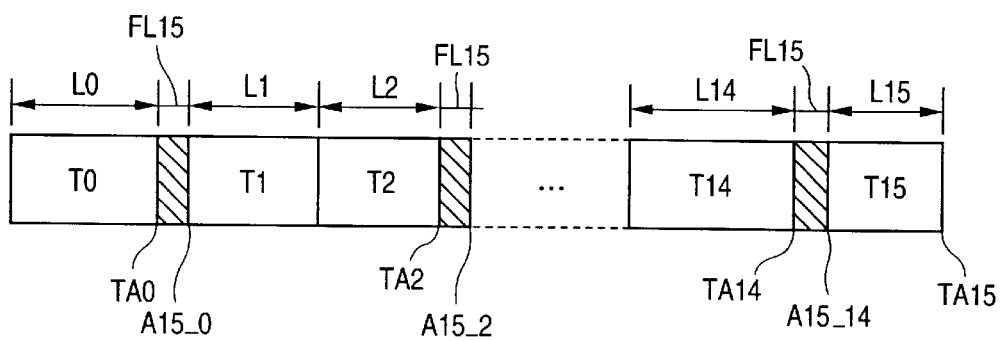

FIG. 16 is a diagram useful in describing the operation of the address controller 7 at this time.

As shown in FIG. 16, the address controller 7 stores a write-enable flag, on a per-tile basis, indicating whether writing can be performed or not with regard to the tile. The illustrated example is for a case where the code stream of tile 15 (T15) has produced an overflow in the memory 3. When the address controller 7 is to split the code stream of tile 15, it refers to the write-enable flags of each of the tiles and adopts only tiles for which the write-enable flag is "1" as tiles to be overwritten. For example, if tile 1 (T1) in the second embodiment corresponds to a binary image, then the write-enable flag for this tile is "0" (write disable) and therefore this tile is not overwritten. Accordingly, the number of fragments into which the code stream of tile 15 is split becomes equal to the number of tiles for which the write-enable flags are "1" (write enable) among the tiles already stored in the memory 3. In this example, the number of fragments is "10".

The overwrite amount FL15 is calculated from the number of fragments and the overflow quantity Ov. Further, the entry portion in FIG. 16 holds a list 1600 of overwrite starting addresses for tiles for which the write-enable flag is "1". Operation in other respects is basically the same as that of the first embodiment.

The above can be implemented with the above-described flowchart of FIG. 15 by making the number of fragments into which overflow is to be split at step S5 equal to the number of tiles for which overwrite is enabled among the tiles, and storing at step S6 the code-stream fragments in respective ones of the areas in which the code streams of the write-enabled tiles have been stored.

When image data is to be decoded, on the other hand, this can be achieved by reading the code streams out of the memory 3 by processing similar to that of the first embodiment.

Thus, in accordance with the second embodiment as described above, code is not written over specific tiles even when overflow occurs. As a result, there is no decline in the image quality of these tiles as compared with the time of encoding. In particular, if these tiles were reversibly encoded, the images belonging to these tiles will match perfectly the images that prevailed prior to encoding and a decline in the image quality of important portions of an image can be prevented.

[Third Embodiment]

In the first and second embodiments described above, the type of image is discriminated tile by tile. However, there is a possibility that a tile will contain a mixture of natural image and a composite or binary image. In this case, if whether or not overwrite is to be performed is decided tile by tile, as in the second embodiment, there is a possibility that the image quality of a part of a tile that must be reversible will decline. In the third embodiment, therefore, there will be described a method in which a decline in image quality is not brought about even when a tile contains a mixture of images of different types.

Within a tile to be encoded, a region of interest (ROI) that is to be decoded at an image quality higher than that of its surroundings is decided by the image region discriminator 8, and mask information indicating which coefficients belong to the designated region is generated by the image region discriminator 8 when the tile of interest is subjected to the discrete wavelet transform.

Figure 17:
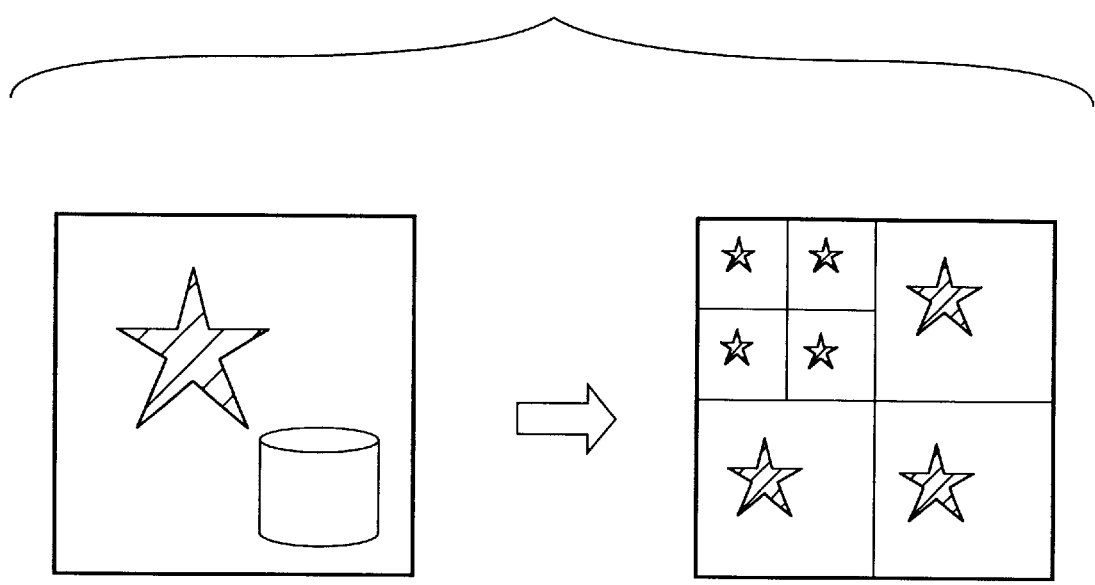
FIG. 17 is a diagram useful in describing an example of an ROI (Region of Interest) according to a third embodiment of the present invention.

FIG. 17 illustrates an example of a case where mask information is generated.

If a star-shaped mask region has been designated in an image by a prescribed method, as indicated on the left side of FIG. 17, the image region discriminator 8 calculates the portion of each subband occupied by this designated mask region when the image data which contains this ROI is subjected to the discrete wavelet transform. The mask region is a domain, which includes the transform coefficients of the surroundings, necessary when restoring the image data that is on the boundary of the ROI.

An example of the mask information thus calculated in shown on the right side of FIG. 17. In this example, mask information for when a two-level two-dimensional discrete wavelet transform is applied to the image on the left side of FIG. 17 is expressed as illustrated. In FIG. 17, the star-shaped portion is the ROI, the bits constituting the mask information within this ROI are "1"s and the bits of the other mask information are "0"s. The entirety of this mask information is identical with the composition of the transform coefficients obtained by the two-dimensional discrete wavelet transform. By scanning the bits within the mask information, therefore, it is possible to identify whether the coefficients at the corresponding positions fall within the ROI. The mask information thus produced is output to the image encoder 2 and image decoder 4 via the compression mode designation unit 9.

Parameters which specify the image quality for the ROI enter the compression mode designation unit 9 from an input path (e.g., a keyboard or pointing device operated by the user), not shown. The entered parameters may be numerical values expressing a compression rate assigned to the ROI, or numerical values representing the image quality of this region. On the basis of these parameters, the compression mode designation unit 9 calculates a bit-shift quantity B for the coefficients in the ROI and outputs this to the image encoder 2 and image decoder 4 together with the mask information.

In a manner similar to that of the first embodiment, the discrete wavelet transformation unit 201 subjects the entered image data to a discrete wavelet transform and outputs the coefficients. Next, the quantizer 202 (see FIG. 3) executes processing based upon the input from the compression mode designation unit 9, as will be described below.

The quantizer 202 quantizes the entered coefficients by a predetermined quantization step, as indicated by Equations (3) to (5), and outputs indices corresponding to the quantized values. Further, the quantizer 202 changes the quantization indices in accordance with the following equations based upon the mask and shift quantity B that have entered from the compression mode designation unit 9:

$$q'=q \times 2^B; m=1 \qquad (13)$$

$$q'=q; m=0 \qquad (14)$$

where m represents the value of a mask at the position of the quantization index. By virtue of the processing described above, only a quantization index that belongs to the designated ROI is shifted up by B bits in the image region discriminator 8.

Figure 18A:
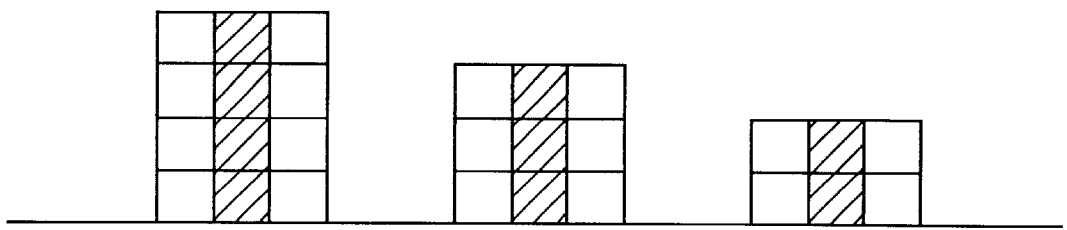
FIGS. 18A and 18B are diagrams useful in describing a bit shift based upon an ROI.
Figure 18B:
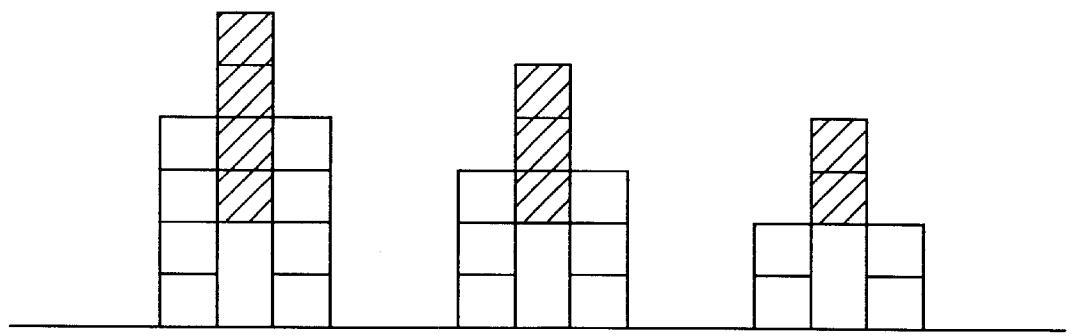
Figure 19A:
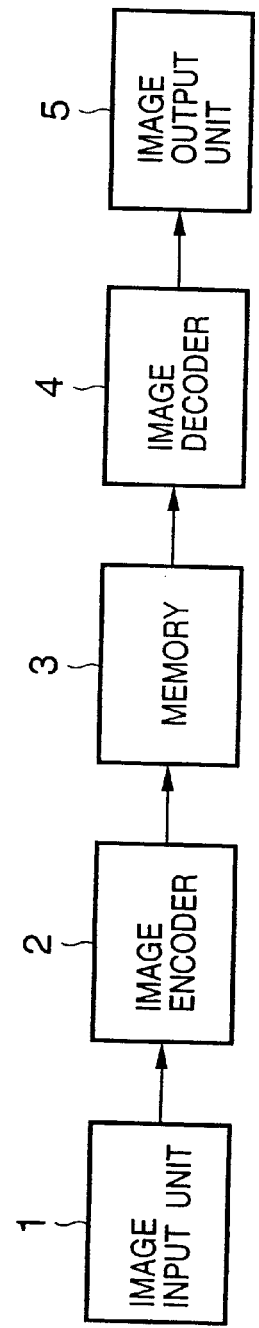
FIGS. 19A and 19B are block diagrams showing the structure of an image processing apparatus according to an example of the prior art.
Figure 19B:
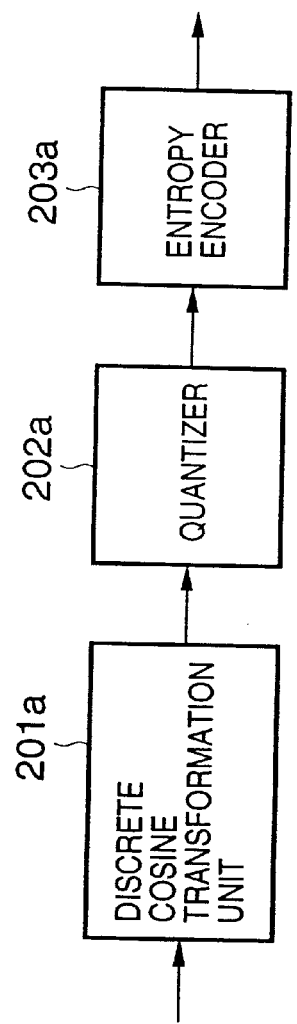

FIGS. 18A and 18B are diagrams useful in describing a change in quantization index by such shift-up. In FIG. 18A, three quantization indices exist in three subbands. If the value of mask information of a quantization index that has been subjected to screening is "1" and the number B of shifts is "2", then the quantization indices after the shift will be as shown in FIG. 18B. The quantization indices that have been changed in this manner are output to the entropy encoder 203 and are encoded thereby. In the third embodiment, the composition of the code streams output as a result of encoding are basically no different from those shown in FIGS. 7A to 7D. However, by bit-shifting the quantization indices a predetermined amount to encode the bit planes, as shown in FIGS. 18A and 18B, the encoded data of the coefficients that belong to the ROI can be placed near to the front side of the code stream.

Even if the code streams thus generated undergo overwriting of code streams by the method described in the first or second embodiment, the likelihood that the ROI encoded data will be overwritten is very small. This makes it possible to maintain the image quality of the ROI. Furthermore, in order to maintain the image quality of the ROI, the address controller 7 may be so adapted that the bit planes overwritten will not extend to the bit planes of the ROI.

The method described in the third embodiment decodes code streams that have been stored in the memory 3. With the exception of the inverse quantizer 402 of the image decoder 4, however, processing basically is similar to that of the foregoing embodiments. Accordingly, the operation of the inverse quantizer 402 only will be described.

The inverse quantizer 402 reconstructs discrete wavelet transform coefficients from the entered quantization indices in accordance with the following equations:

$$c' = \Delta \times q / 2^U; \quad q \neq 0 \quad (15)$$

$$c' = 0; \quad q = 0 \quad (16)$$

$$U = B; \quad m = 1 \quad (17)$$

$$U = 0; \quad m = 0 \quad (18)$$

where q represents a quantization index and Δ a quantization step. The quantization step Δ has a value the same as that used when encoding was performed. Further, B represents a bit-shift count that has entered from the compression mode designation unit 9, m denotes the value of a mask at the position of the particular quantization index, and c' represents a transformation coefficient that has been restored. This is obtained by restoring a coefficient represented by s or d at the time of encoding. The transformation coefficient c' is output to the inverse discrete wavelet transformation unit 403.

Thus, as described above, a coefficient belonging to the ROI is not overwritten in the memory 3 by a bit shift. Even if a tile contains a mixture of images of different types, therefore, the image can be formed while maintaining the image quality of the necessary portions at the time of decoding.

<Other Embodiments>

The present invention is not limited solely to the above-described apparatus and method that implement the foregoing embodiments. The scope of the present invention covers also a case where the program codes of software for implementing the foregoing embodiments are supplied to a computer (CPU or MPU) in a system or apparatus and the system or apparatus is made to operate the various devices described above.

In this case, the program codes of the program per se implement the functions of the foregoing embodiments, and the program codes per se as well as the means for supplying these program codes to the computer, i.e., the storage medium on which these program codes have been stored, fall within the scope of the present invention.

Examples of storage media that can be used for supplying the program code are a floppy disk, hard disk, optical disk, magneto-optical disk, CD-ROM, magnetic tape, non-volatile type memory card or ROM, etc.

Furthermore, besides the case where the aforesaid functions according to the embodiments are implemented by controlling the various devices in accordance solely with the supplied program codes, the scope of the present invention covers a case where the program codes cooperate with an operating system running on the computer or with other application software or the like to implement the foregoing embodiments.

Furthermore, the scope of the present invention further covers also a case where, after the program codes read from the storage medium are written in a function expansion board of a computer or in a memory provided in a function expansion unit connected to the computer, a CPU or the like contained in the function expansion board or function expansion unit performs a part of or the entire process in accordance with the designation of program codes and implements the functions of the above embodiments.

Thus, in accordance with the embodiments as described above, when an image is divided into a plurality of tiles, the tiles are encoded independently and the code is stored in memory, a code stream that overflows from the memory is split into equal fragments and the fragments are written over the code streams of tiles, which have already been encoded and stored, in the opposite direction starting from the terminus addresses of these code streams. As a result, the writing of codes to a memory having a limited storage capacity can be performed without degrading the image quality of some of the tiles.

Furthermore, by suitably selecting what may be overwritten or by placing coefficients, which represent an image signal of an area that must not be allowed to undergo a decline in image quality, near to the front side of a code stream, the image quality of an essential part of an image can be held constant.

Though the foregoing description takes as an example a case where one screen of an image is divided into tiles and the tiles are encoded one at a time, the concept of the present invention has other applications as well. Though the concept of a tile described above has been elucidated as one unit of storage in a memory or one unit of encoding of a bit plane, the present invention need not necessarily be considered to be merely an encoding control technique for tiles when image data of a single screen is divided into a plurality of tiles. For example, if one considers the fact that the image data of a single screen is replaced by the above-mentioned tiles as set forth above, then a case where the image data of a plurality of screens are encoded and stored in memory screen by screen is also conceivable. If the above-described types of control are executed at the time of such encoding and storage of individual screens in a memory, the image data of a plurality of screens can be stored reliably in a memory having a predetermined capacity. Further, it is possible to consider the above-mentioned plurality of screens as being equivalent to a plurality of frames of a moving-picture sequence.

The present invention is not limited to the above embodiments and various changes and modifications can be made within the spirit and scope of the present invention. Therefore, to apprise the public of the scope of the present invention, the following claims are made.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for dividing an input image into a plurality of tiles to process the image, comprising:
   encoding means for subjecting individual tiles of the plurality of tiles to encoding processing on a per-bit-plane basis;
   storage means for storing a code stream, which is encoded by said encoding means, tile by tile;
   determination means for determining whether all code of tiles that have been encoded by said encoding means can be stored in said storage means when the code streams encoded by said encoding means are stored successively in said storage means; and
   control means, responsive to a signal from said determination means indicating that all of the code cannot be stored, for executing control so as to substantially equally divide the amount of code that overflows said storage means and store the divided code in said storage means in an opposite direction from a storing start address of each of code areas of tiles, by distributing the divided code over the code areas of tiles that have already been stored and specifying the storing start address of each code area.

2. The apparatus according to claim 1, wherein said control means includes:
   first address generating means for generating addresses in a forward direction for storing code streams encoded by said encoding means in said storage means; and
   second address generating means for generating addresses in a reverse direction for substantially equally dividing the amount of code that overflows said storage means and storing the divided code in said storage means by distributing the divided code over code areas of tiles that have already been stored,
   wherein said substantially equally divided amounts of code are written over said code areas in the opposite direction from the storing start address.

3. The apparatus according to claim 1, wherein said control means substantially equally divides the amount of code that overflows said storage means in accordance with the number of tiles, in a case where said determination means issues the signal indicating that all of the code cannot be stored.

4. The apparatus according to claim 1, wherein said encoding means includes:
   serial transformation means for applying a predetermined serial transformation to an input image signal;
   quantization means for quantizing transformation coefficients, which are obtained by said serial transformation means, to decompose the coefficients into bit planes; and
   encoding means for encoding the bit planes, which have been quantized by said quantization means, in a direction extending from higher- to lower-order bit planes.

5. The apparatus according to claim 4, wherein said serial transformation means includes discrete wavelet transformation means capable of outputting integral coefficients.

6. The apparatus according to claim 4, wherein said encoding means shifts coefficients, which have been generated by said sequence transformation means, a predetermined amount in the direction of higher-order bits based upon an amount of code of each tile encoded by said encoding means.

7. The apparatus according to claim 1, further comprising image region discriminating means for discriminating types of images of respective ones of the plurality of tiles,
   wherein said encoding means changes a method of encoding a tile in accordance with the type of image thereof discriminated by said image region discriminating means.

8. The apparatus according to claim 1, further comprising image region discriminating means for discriminating types of images of respective ones of the plurality of tiles,
   wherein in response to a signal from said determination means indicating that all of the code cannot be stored, said control means executes control so as to substantially equally divide the amount of code that overflows said storage means and stores the divided code in said storage means by distributing the divided code over code areas of tiles that have already been stored with the exception of code areas of tiles of specific images discriminated by said image region discriminating means.

9. The apparatus according to claim 1, further comprising:
   read-out means for reading out code that has been stored in said storage means; and
   decoding means for decoding the code that has been read out by said read-out means.

10. An image processing method for dividing an input image into a plurality of tiles to process the image, comprising:
    an encoding step, of subjecting individual tiles of the plurality of tiles to encoding processing on a per-bit-plane basis;
    a storage step, of storing a code stream, which is encoded at said encoding step, tile by tile in a memory;
    a determination step, of determining whether all code of tiles that have been encoded at said encoding step can be stored in said memory when the code streams encoded at said encoding step are stored successively in said memory; and
    a control step, responsive to a determination at said determination step that all of the code cannot be stored, of executing control so as to substantially equally divide the amount of code that overflows said memory and store the divided code in said memory in an opposite direction from a storing start address of each of code areas of tiles, by distributing the divided code over the code areas of tiles that have already been stored and specifying the storing start address of each code area.

11. The method according to claim 10, wherein said control step includes:
    a first address generating step, of generating addresses in a forward direction for storing code streams encoded at said encoding step in said memory; and
    a second address generating step, of generating addresses in a reverse direction for substantially equally dividing the amount of code that overflows said memory and storing the divided code in said memory by distributing the divided code over code areas of tiles that have already been stored,
    said substantially equally divided amounts of code being written over the code areas starting in the opposite direction from the storing start address.

12. The method according to claim 10, wherein said control step includes substantially equally dividing the amount of code that overflows said memory in accordance with the number of tiles, in a case where said determination step determines that all of the code cannot be stored.

13. The method according to claim 10, wherein said encoding step includes:

a serial transformation step of applying a predetermined serial transformation to an input image signal;

a quantization step of quantizing transformation coefficients, which are obtained at said serial transformation step, to decompose the coefficients into bit planes; and an encoding step of encoding the bit planes, which have been quantized at said quantization step, in a direction extending from higher- to lower-order bit planes.

14. The method according to claim 13, wherein said serial transformation step includes using a discrete wavelet transformation capable of outputting integral coefficients.

15. The method according to claim 13, wherein said encoding step shifts coefficients, which have been generated at said serial transformation step, a predetermined amount in the direction of higher-order bits based upon an amount of code of each tile encoded in said encoding step.

16. The method according to claim 10, further comprising an image region discriminating step, of discriminating types of images of respective ones of the plurality of tiles, wherein said encoding step includes changing a method of encoding a tile in accordance with the type of image thereof discriminated in said image region discriminating step.

17. The method according to claim 10, further comprising an image region discriminating step, of discriminating types of images of respective ones of the plurality of tiles;

wherein in response to a determination at said determination step that all of the code cannot be stored, said control step includes executing control so as to substantially equally divide the amount of code that overflows said memory and storing the divided code in said memory by distributing the divided code over code areas of tiles that have already been stored with the exception of code areas of tiles of specific images discriminated in said image region discriminating step.

18. The method according to claim 10, further comprising:

a read-out step, of reading out code that has been stored in said memory; and a decoding step, of decoding the code that has been read out at said read-out step.

19. A computer-readable storage medium storing a program for executing an image processing method for dividing an input image into a plurality of tiles to process the image, comprising:

an encoding-step module, for subjecting individual tiles of the plurality of tiles to encoding processing on a per-bit-plane basis;

a storage-step module, for storing a code stream, which is encoded by said encoding-step module, tile by tile in a memory;

a determination-step module, for determining whether all code of tiles that have been encoded by said encoding-step module can be stored in said memory when the code streams encoded by said encoding-step module are stored successively in said memory; and a control-step module, responsive to a determination by said determination-step module that all of the code cannot be stored, for executing control so as to substantially equally divide the amount of code that overflows said memory and store the divided code in said memory by distributing the divided code over code areas of tiles that have already been stored.

20. An image processing apparatus for encoding a plurality of images and storing the processed images in a prescribed memory, comprising:

wavelet transformation means for wavelet-transforming input image data image by image;

encoding means for changing transformation coefficients, which have been obtained by said wavelet transformation means, to bit planes from higher- to lower-order bits, and encoding the bit planes in one bit plane unit;

storage control means for storing encoded data, which has been obtained by said encoding means, in a memory image by image;

determination means for determining whether all encoded data of each of the images that have been encoded by said encoding means can be stored in said memory when the encoded data obtained by said encoding means is stored successively in said memory; and control means, responsive to a signal from said determination means indicating that all of the encoded data cannot be stored, for executing control so as to equally divide encoded data that overflows said memory and store the divided encoded data in said memory by writing the divided encoded data in an opposite direction from each of terminus addresses of storage areas of lower-order bit planes of each of the images.

21. The apparatus according to claim 20, wherein the plurality of images are images obtained by dividing one screen into a plurality of tiles.

22. The apparatus according to claim 20, wherein one image is an image corresponding to one screen.

23. An image processing method in an image processing apparatus for encoding a plurality of images and storing the processed images in a prescribed memory, comprising:

a wavelet transformation step, of wavelet-transforming input image data image by image;

an encoding step, of changing transformation coefficients, which have been obtained in said wavelet transformation step, to bit planes from higher- to lower-order bits, and encoding the bit planes in one bit plane unit;

a storage control step, of storing encoded data, which has been obtained in said encoding step, in a memory image by image;

a determination step, of determining whether all encoded data of each of the images that have been encoded in said encoding step can be stored in said memory when the encoded data obtained in said encoding step is stored successively in said memory; and a control step, responsive to a determination in said determination step that all of the encoded data cannot be stored, for executing control so as to equally divide encoded data that overflows said memory and store the divided encoded data in said memory by writing the divided encoded data in an opposite direction from a terminus address of each of storage areas of lower-order bit planes of each of the images.

24. A computer-readable storage medium storing a program for executing an image processing method for encoding a plurality of images and storing the processed images in a prescribed memory, comprising:

a wavelet transformation step module, for wavelet-transforming input image data image by image;

an encoding step module for changing transformation coefficients, which have been obtained by said wavelet transformation step module, to bit planes from higher- to lower-order bits, and encoding the bit planes in one bit plane unit;

a storage step module, for storing encoded data, which has been obtained by said encoding step module, in a memory image by image;

a determination step module, for determining whether all encoded data of each of the images that have been encoded by said encoding step module can be stored in said memory when the encoded data obtained by said encoding step module is stored successively in said memory; and a control step module, responsive to determination by said determination step module indicating that all of the encoded data cannot be stored, for executing control so as to equally divide encoded data that overflows said memory and store the divided encoded data in said memory by writing the divided encoded data in an opposite direction from a terminus address of each of storage areas of lower-order bit planes of each of the images.

25. An image processing apparatus for encoding a plurality of images and storing the processed images in a prescribed memory, comprising:

wavelet transformation means for wavelet-transforming input image data image by image;

encoding means for changing transformation coefficients, which have been obtained by said wavelet transformation means, to bit planes from higher- to lower-order bits, and encoding the bit planes in one bit plane unit;

storage control means for storing, in a memory, encoded data, which corresponds to a plurality of images, obtained by said encoding means;

determination means for determining whether all encoded data obtained by said encoding means can be stored in said memory; and control means, responsive to a signal from said determination means indicating that all of the encoded data cannot be stored, for executing control so as to invalidate bit planes uniformly from a terminus address of each of lower-order bit planes of each of the images.

26. The apparatus according to claim 25, wherein the plurality of images are images obtained by dividing one screen into a plurality of tiles.

27. The apparatus according to claim 25, wherein one image is an image corresponding to one screen.

28. An image processing method for encoding a plurality of images and storing the processed images in a prescribed memory, comprising:

a wavelet transformation step, of wavelet-transforming input image data image by image;

an encoding step, of changing transformation coefficients, which have been obtained in said wavelet transformation step, to bit planes from higher- to lower-order bits, and encoding the bit planes in one bit plane unit;

a storage control step, of storing, in a memory, encoded data, which corresponds to a plurality of images, obtained in said encoding step;

a determination step, of determining whether all encoded data obtained in said encoding step can be stored in said memory; and a control step, responsive to a determination in said determination step indicating that all of the encoded data cannot be stored, of executing control so as to invalidate bit planes uniformly from a terminus address of each of lower-order bit planes of each of the images.

29. A computer-readable storage medium on which an image processing program, which is for encoding a plurality of images and storing the processed images in a prescribed memory, has been stored so as to be readable by a computer, said program comprising:

a wavelet transformation step, of wavelet-transforming input image data image by image;

an encoding step, of changing transformation coefficients, which have been obtained in said wavelet transformation step, to bit planes from higher- to lower-order bits, and encoding the bit planes in one bit plane unit;

a storage control step, of storing, in a memory, encoded data, which corresponds to a plurality of images, obtained in said encoding step;

a determination step, of determining whether all encoded data obtained in said encoding step can be stored in said memory; and a control step, responsive to a determination in said determination step indicating that all of the encoded data cannot be stored, of executing control so as to invalidate bit planes uniformly from a terminus address of each of lower-order bit planes of each of the images.

* * * * *